US012639276B2

(12) United States Patent
Portisch et al.

(10) Patent No.: US 12,639,276 B2
(45) Date of Patent: May 26, 2026

(54) DETERMINING AND ENHANCING COMPLETENESS METRICS IN DATA STRUCTURES WITH INSTANCES, CLASSES, AND PROPERTIES

(71) Applicant: SAP SE, Walldorf (DE)

(72) Inventors: Jan Portisch, Bruchsal (DE); Sandra Bracholdt, Dielheim (DE); Volker Saggau, Bensheim (DE); Shraddha Shetty, Mannheim (DE)

(73) Assignee: SAP SE, Walldorf (DE)

( * ) Notice: Subject to any disclaimer, the term of this patent is extended or adjusted under 35 U.S.C. 154(b) by 18 days.

(21) Appl. No.: 18/943,725

(22) Filed: Nov. 11, 2024

(65) Prior Publication Data

US 2026/0133946 A1 May 14, 2026

(51) Int. Cl.
*G06F 16/215* (2019.01)
(52) U.S. Cl.
CPC .................................. *G06F 16/215* (2019.01)
(58) Field of Classification Search
None
See application file for complete search history.

(56) References Cited

U.S. PATENT DOCUMENTS

| | | | | |
|---|---|---|---|---|
| 2018/0113928 A1* | 4/2018 | Oberhofer | .............. | G06N 20/00 |
| 2023/0289696 A1* | 9/2023 | Narechania | ........... | G06F 16/215 |

* cited by examiner

*Primary Examiner* — Yu Zhao
(74) *Attorney, Agent, or Firm* — Klarquist Sparkman, LLP

(57) ABSTRACT

The present disclosure provides techniques and solutions for determining the completeness of a collection of datatype instances. Completeness can reflect the degree to which instances include values for instance properties. A first collection of instances is received, each including one or more instance types and stored as one or more data types in a data structure. The instance types define properties of the instances, and some instances lack values for certain properties while having values for others. A first completeness metric for a first instance type is determined by analyzing the presence or absence of property values and comparing unfilled properties to a defined set. If the first completeness metric does not meet a threshold, actions are taken, such as adjusting a computing process to access a second collection of instances or receiving values for missing properties.

20 Claims, 25 Drawing Sheets

2200

Receive a first collection of a plurality of instances, the plurality of instances including instances of one or more instance types and being stored as one or more instances of one or more data types in a computer-implemented data structure, where the instance types define one or more properties of instances of the instance type, and where at least a portion of the instances associated with the one or more instance types do not include a value for one or more properties defined by at least one of the respective instance types and include a value for one or more other properties defined by at least one of the respective instance types 2208

Determine a first completeness metric for a first instance type of the one or more instance types by:

Analyze the presence or absence of property values for multiple instances of the plurality of instances having the first instance type 2216

For given instances of the multiple instances, compare a number of properties for the first instance type that are unfilled for the given instance to a set of one or more properties defined for the first instance type 2220

2212

At least in part in response to determining that the first completeness metric does not satisfy a first threshold 2224

Adjust a computing process to access a second collection of a plurality of instances 2228

Receive a value for at least one missing property value of at least one instance of the multiple instances 2232

| Instance | Brand | Model | Color |
|---|---|---|---|
| 1 | Toyota | Camry | Blue |
| 2 | Ford | Mustang | Red |
| 3 | Honda | Accord | Green |
| 4 | BMW | X5 | Blue |
| 5 | Tesla | Model 3 | |
| 6 | Nissan | Altima | Silver |
| 7 | Chevy | Malibu | Black |
| 8 | Audi | A4 | |
| 9 | Hyundai | Sonata | White |
| 10 | Kia | Optima | Red |

$C_{pj} = 8$  (instances where "Color" is specified)
$N_j = 10$  (total instances of the "Car" class)

Formula to calculate $U_{PC}$:

$$U_{PC} = \frac{8}{10} = 0.8$$

FIG. 3

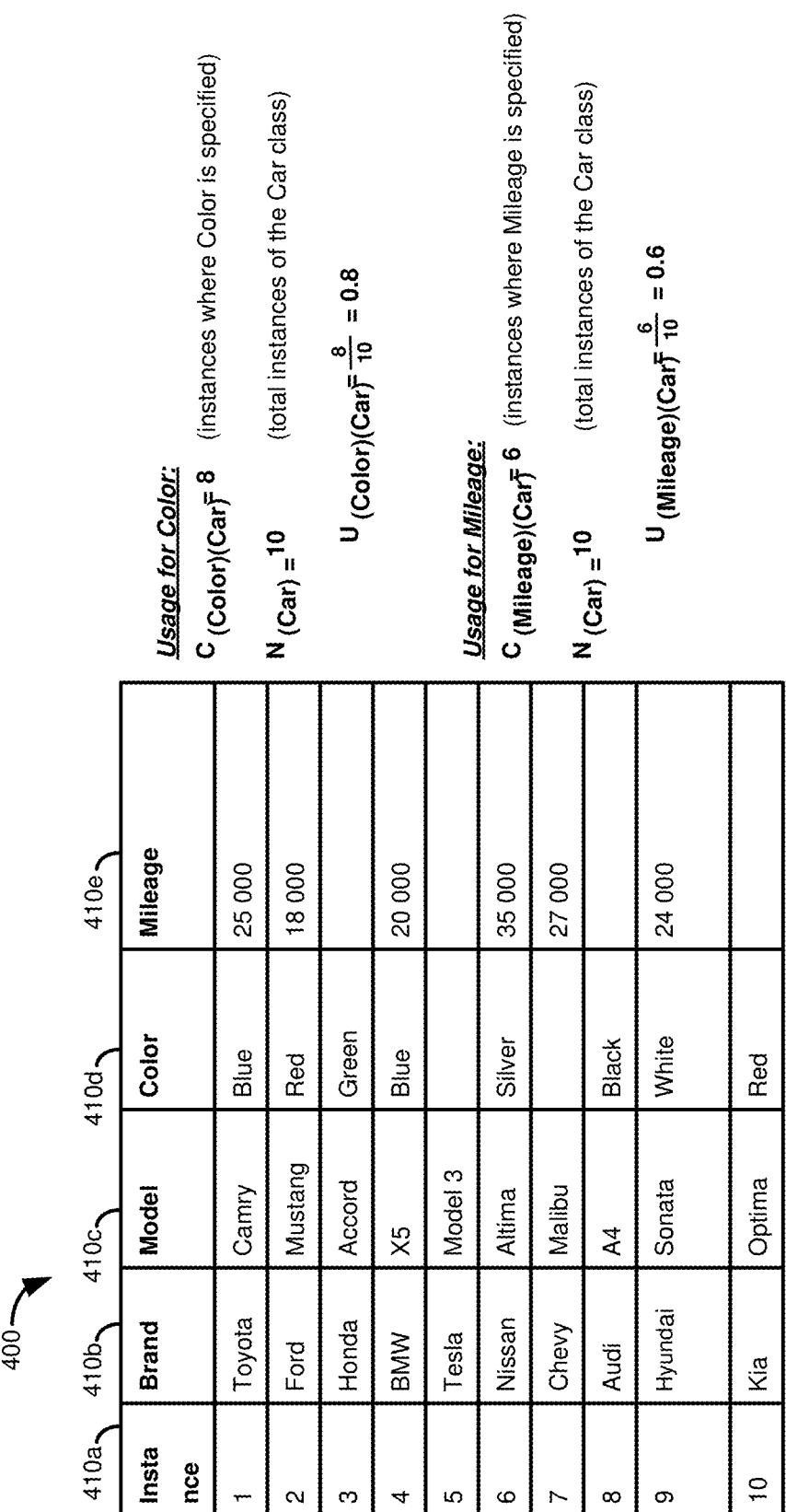

| Instance | Brand | Model | Color | Mileage |
|---|---|---|---|---|
| 1 | Toyota | Camry | Blue | 25 000 |
| 2 | Ford | Mustang | Red | 18 000 |
| 3 | Honda | Accord | Green | |
| 4 | BMW | X5 | Blue | 20 000 |
| 5 | Tesla | Model 3 | | |
| 6 | Nissan | Altima | Silver | 35 000 |
| 7 | Chevy | Malibu | | 27 000 |
| 8 | Audi | A4 | Black | |
| 9 | Hyundai | Sonata | White | 24 000 |
| 10 | Kia | Optima | Red | |

_Usage for Color:_

$C_{(Color)(Car)} = 8$ (instances where Color is specified)

$N_{(Car)} = 10$ (total instances of the Car class)

$U_{(Color)(Car)} = \frac{8}{10} = 0.8$

_Usage for Mileage:_

$C_{(Mileage)(Car)} = 6$ (instances where Mileage is specified)

$N_{(Car)} = 10$ (total instances of the Car class)

$U_{(Mileage)(Car)} = \frac{6}{10} = 0.6$

FIG. 4

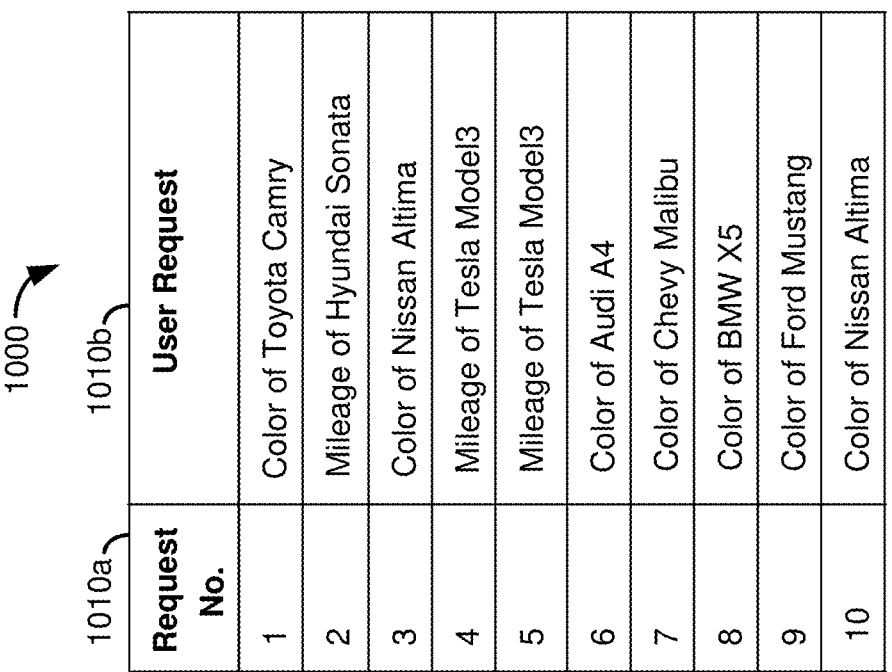

| Request No. | User Request |
|---|---|
| 1 | Color of Toyota Camry |
| 2 | Mileage of Hyundai Sonata |
| 3 | Color of Nissan Altima |
| 4 | Mileage of Tesla Model3 |
| 5 | Mileage of Tesla Model3 |
| 6 | Color of Audi A4 |
| 7 | Color of Chevy Malibu |
| 8 | Color of BMW X5 |
| 9 | Color of Ford Mustang |
| 10 | Color of Nissan Altima |

| Request No. | User Request |
|---|---|
| 11 | Color of Chevy Malibu |
| 12 | Mileage of Tesla Model3 |
| 13 | Color of Honda Accord |
| 14 | Mileage of Tesla Model3 |
| 15 | Mileage of Kia Optima |
| 16 | Color of Hyundai Sonata |
| 17 | Color of Chevy Malibu |
| 18 | Mileage of Tesla Model3 |
| 19 | Color of Tesla Model3 |
| 20 | Mileage of Audi A4 |

| Instance | Number of Instance Requests | Instance Importance |
|---|---|---|
| Toyota Camry | 1 | 1 / 20 = 0,05 |
| Hyundai Sonata | 2 | 2 / 20 = 0,1 |
| Nissan Altima | 2 | 2 / 20 = 0,1 |
| Tesla Model 3 | 6 | 6 / 20 = 0,3 |
| Audi A4 | 2 | 2 / 20 = 0,1 |
| Chevy Malibu | 3 | 3 / 20 = 0,15 |
| BMW X5 | 1 | 1 / 20 = 0,05 |
| Honda Accord | 1 | 1 / 20 = 0,05 |
| Kia Optima | 1 | 1 / 20 = 0,05 |
| Ford Mustang | 1 | 1 / 20 = 0,05 |

| Instance | Property | Missing* | TRP (instance, property) | II(Instance) | PRS(instance, property) | PRS$_n$ (instance, property) |
|---|---|---|---|---|---|---|
| Toyota Camry | Color | No | 1 | 0,05 | 0,05 | 0,0025 |
| Toyota Camry | Mileage | No | 0 | 0,05 | 0 | 0 |
| Fort Mustang | Color | No | 1 | 0,05 | 0,05 | 0,0025 |
| Fort Mustang | Mileage | No | 0 | 0,05 | 0 | 0 |
| Honda Accord | Color | No | 1 | 0,05 | 0,05 | 0,0025 |
| Honda Accord | Mileage | Yes | 0 | 0,05 | 0 | 0 |
| BMW X5 | Color | No | 1 | 0,05 | 0,05 | 0,0025 |
| BMW X5 | Mileage | No | 0 | 0,05 | 0 | 0 |
| Tesla Model 3 | Color | Yes | 1 | 0,3 | 0,3 | 0,015 |
| Tesla Model 3 | Mileage | Yes | 5 | 0,3 | 1,5 | 0,075 |

| Instance | Property | Missing* | TRP (instance, property) | | PRS(instance, property) | | PRS$_n$ (instance, property) |
|---|---|---|---|---|---|---|---|
| Nissan Altima | Color | No | 2 | 0,1 | 0,2 | | 0,01 |
| Nissan Altima | Mileage | No | 0 | 0,1 | 0 | | 0 |
| Chevy Malibu | Color | Yes | 3 | 0,15 | 0,45 | | 0,0225 |
| Chevy Malibu | Mileage | No | 0 | 0,15 | 0 | | 0 |
| Audi A4 | Color | No | 1 | 0,1 | 0,1 | | 0,005 |
| Audi A4 | Mileage | Yes | 1 | 0,1 | 0,1 | | 0,005 |
| Hyundai Sonata | Color | No | 1 | 0,1 | 0,1 | | 0,005 |
| Hyundai Sonata | Mileage | No | 1 | 0,1 | 0,1 | | 0,005 |
| Kia Optima | Color | No | 0 | 0,05 | 0 | | 0 |
| Kia Optima | Mileage | Yes | 1 | 0,05 | 0,05 | | 0,0025 |

| Instance | Property | Missing* | TRP (instance, property) | II(Instance) | PRS(instance, property) | $PRS_n$ (instance, property) |
|----------|----------|----------|--------------------------|--------------|-------------------------|------------------------------|
| Tesla Model 3 | Mileage | Yes | 5 | 0,3 | 1,5 | 0,075 |
| Chevy Malibu | Color | Yes | 3 | 0,15 | 0,45 | 0,0225 |
| Tesla Model 3 | Color | Yes | 1 | 0,3 | 0,3 | 0,015 |
| Nissan Altima | Color | No | 2 | 0,1 | 0,2 | 0,01 |

| Instance | Property | Missing* | TRP (instance, property) | II(Instance) | PRS(instance, property) | $PRS_n$ (instance, property) |
|---|---|---|---|---|---|---|
| Tesla Model 3 | Mileage | Yes | 5 | 0,3 | 1,5 | 0,075 |
| Chevy Malibu | Color | Yes | 3 | 0,15 | 0,45 | 0,0225 |
| Tesla Model 3 | Color | Yes | 1 | 0,3 | 0,3 | 0,015 |
| Nissan Altima | Color | No | 2 | 0,1 | 0,2 | 0,04 |

*Knowledge Graph Completeness of Instances for Class "CAR"*
*Expected Completeness for Class "CAR": 0.85*
*Variance for Class "CAR": 60,4%*

| Instance | Brand | Model | AC | Completeness | Instance Importance |
|---|---|---|---|---|---|
| 1 | Toyota | Camry | 1 | 1.17 | 0,05 |
| 2 | Ford | Mustang | 1 | 1.17 | 0,05 |
| 3 | Honda | Accord | 0.75 | 0.88 | 0,05 |
| 4 | BMW | X5 | 1 | 1.17 | 0,05 |
| 5 | Tesla | Model 3 | 0.5 | 0.58 | 0,3 |
| 6 | Nissan | Altima | 1 | 1.17 | 0,1 |
| 7 | Chevy | Malibu | 1 | 1.17 | 0,15 |
| 8 | Audi | A4 | 0.75 | 0,88 | 0,1 |
| 9 | Hyundai | Sonata | 1 | 1.17 | 0,1 |
| 10 | Kia | Optima | 0,75 | 0,88 | 0,05 |

Instance Analysis

*Knowledge Graph Section*
1610

1600

1620

1650

1630

1652

1640

1632a, 1632b, 1632c, 1632d, 1632e, 1632f

Heat Map of User Requests

*Graph Representation for Classes of the Knowledge Graph*

2200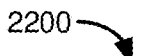

Receive a first collection of a plurality of instances, the plurality of instances including instances of one or more instance types and being stored as one or more instances of one or more data types in a computer-implemented data structure, where the instance types define one or more properties of instances of the instance type, and where at least a portion of the instances associated with the one or more instance types do not include a value for one or more properties defined by at least one of the respective instance types and include a value for one or more other properties defined by at least one of the respective instance types 2208

Determine a first completeness metric for a first instance type of the one or more instance types by:

Analyze the presence or absence of property values for multiple instances of the plurality of instances having the first instance type 2216

For given instances of the multiple instances, compare a number of properties for the first instance type that are unfilled for the given instance to a set of one or more properties defined for the first instance type 2220

2212

At least in part in response to determining that the first completeness metric does not satisfy a first threshold 2224

Adjust a computing process to access a second collection of a plurality of instances 2228

Receive a value for at least one missing property value of at least one instance of the multiple instances 2232

CLOUD COMPUTING SERVICES

2410

COMPUTING DEVICE 2420

COMPUTING DEVICE 2422

COMPUTING DEVICE 2424

DETERMINING AND ENHANCING COMPLETENESS METRICS IN DATA STRUCTURES WITH INSTANCES, CLASSES, AND PROPERTIES

FIELD

The present disclosure generally relates to processes for analyzing completeness of data sets.

BACKGROUND

Knowledge graphs (KGs) have found increasing use as computer-implemented data repositories for organizing and representing structured information in a way that facilitates intelligent querying, inference, and analysis. A knowledge graph includes a set of classes (or types) representing conceptual entities, and instances (or entities) representing specific examples of those classes. Each instance is associated with a set of properties (or attributes) that describe its characteristics. For example, in a knowledge graph about academic publications, the class "Author" can have instances such as "John Smith" or "Mary Johnson," each of which is described by properties such as "affiliation" and "publication count."

Knowledge graphs are often aligned with an ontology, which defines the relationships between classes and properties, and the constraints governing them. An ontology acts as a formal framework that provides the schema and logical structure underlying the knowledge graph, so that instances within a class adhere to specific rules and constraints. This allows systems to infer new information, validate consistency, and perform reasoning over the data. For example, an ontology might dictate that every instance of the class "Author" should have a property "affiliation," and that "affiliation" should be an instance of the class "Institution."

However, the effectiveness of a knowledge graph is often contingent on the completeness, as well as the accuracy, of the information it contains. Missing property values for instances can degrade the quality and usefulness of a knowledge graph. For example, if an "Author" instance lacks an "affiliation" property, queries that rely on the "affiliation" information might yield incomplete or erroneous results. Inconsistent or incomplete data can also negatively impact downstream applications such as recommendation engines, predictive models, or data-driven decision-making tools. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for determining the completeness of a collection of datatype instances. Completeness can reflect the degree to which instances include values for instance properties. A first collection of instances is received, each including one or more instance types and stored as one or more data types in a data structure. The instance types define properties of the instances, and some instances lack values for certain properties while having values for others. A first completeness metric for a first instance type is determined by analyzing the presence or absence of property values and comparing unfilled properties to a defined set. If the first completeness metric does not meet a threshold, actions are taken, such as adjusting a computing process to access a second collection of instances or receiving values for missing properties.

In aspect, the present disclosure provides a process of determining data completeness in a computing system, and taking various actions if a threshold completeness is not satisfied. A first collection of a plurality of instances is received. The plurality of instances include instances of one or more instance types and is stored as one or more instances of one or more data types in a computer-implemented data structure. The instance types define one or more properties of instances of the instance type. At least a portion of the instances associated with the one or more instance types do not comprise a value for one or more properties defined by at least one of the respective instance types and comprise a value for one or more other properties defined by at least one of the respective instance types.

A first completeness metric for a first instance type of the one or more instance types is determined. This involves analyzing the presence or absence of property values for multiple instances of the plurality of instances having the first instance type. For given instances of the multiple instances, a number of properties for the first instance type that are unfilled for the given instance is compared to a set of one or more properties defined for the first instance type.

In response to determining that the first completeness metric does not satisfy a first threshold, either a computing process is adjusted to access a second collection of a plurality of instances, or a value for at least one missing property value of at least one instance of the multiple instances is received.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 is an example data set that is used in explaining how class property completeness metrics can be determined.

FIG. 4 is another example data set that is used in explaining how class property completeness metrics, as well as instance completeness metrics, can be determined.

FIG. 10 provides an example data set that is used in examples of calculating usage-based completeness metrics.

FIG. 11 provides an example data set that includes usage data for class instances and calculates instance importance values.

FIGS. 12A and 12B provide an example data set that includes usage data for class instances and various importance or property metric values.

FIG. 13 provides filtered entries of the data set of FIGS. 12A and 12B, filtered by property request score.

FIG. 22 is an example flowchart of a process of determining data completeness in a computing system, and taking various actions if a threshold completeness is not satisfied. A first collection of a plurality of instances is received.

DETAILED DESCRIPTION

Example 1)—Overview

Figure 1:
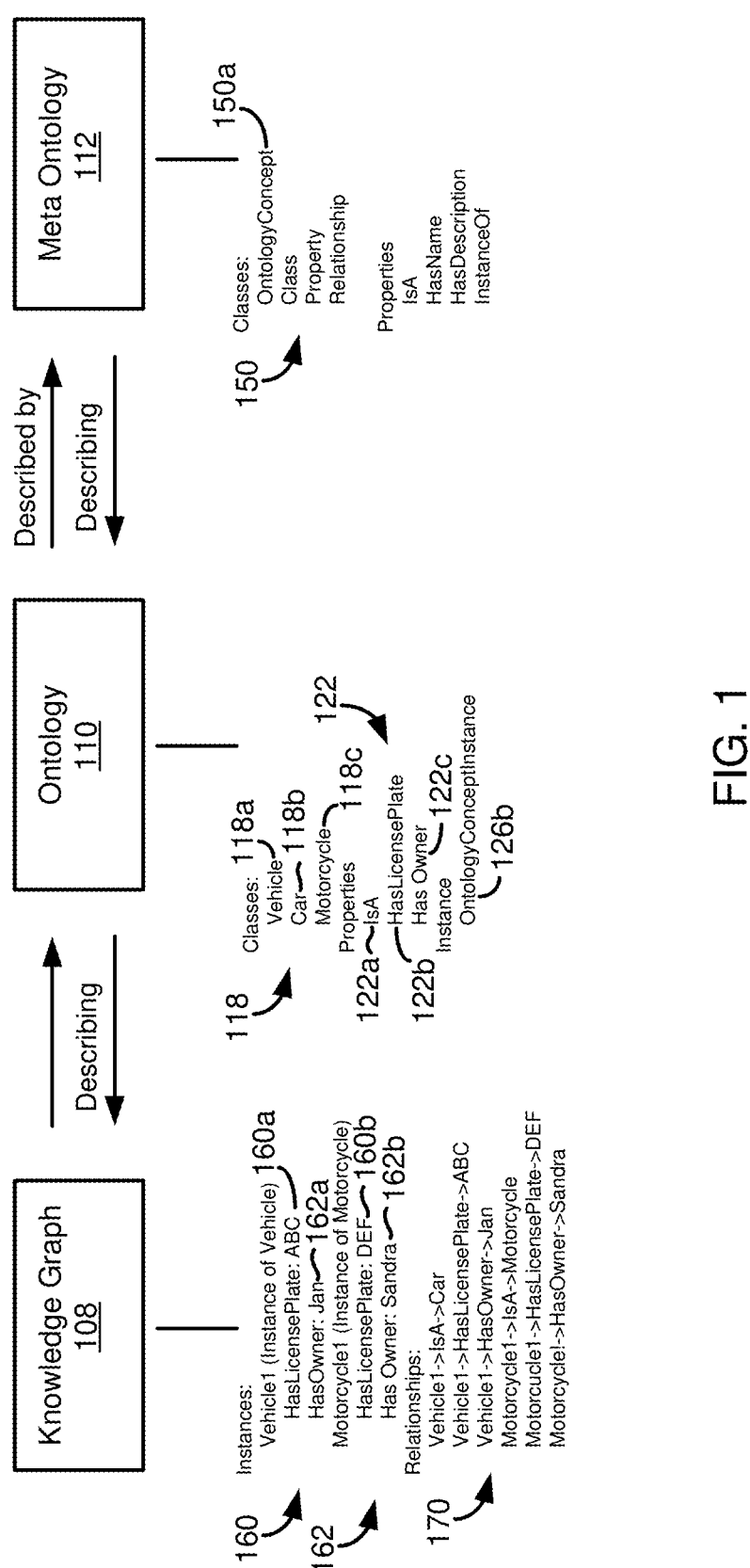
FIG. 1 is a diagram illustrating relationships between, and components of, a knowledge graph, an ontology, and a meta ontology.

Knowledge graphs (KGs) have found increasing use as computer-implemented data repositories for organizing and representing structured information in a way that facilitates intelligent querying, inference, and analysis. A knowledge graph includes a set of classes (or types) representing conceptual entities, and instances (or entities) representing specific examples of those classes. Each instance is associated with a set of properties (or attributes) that describe its characteristics. For example, in a knowledge graph about academic publications, the class "Author" can have instances such as "John Smith" or "Mary Johnson," each of which is described by properties such as "affiliation" and "publication count."

Knowledge graphs are often aligned with an ontology, which defines the relationships between classes and properties, and the constraints governing them. An ontology acts as a formal framework that provides the schema and logical structure underlying the knowledge graph, so that instances within a class adhere to specific rules and constraints. This allows systems to infer new information, validate consistency, and perform reasoning over the data. For example, an ontology might dictate that every instance of the class "Author" should have a property "affiliation," and that "affiliation" should be an instance of the class "Institution."

Knowledge graphs are used in a variety of technical areas, including semantic search, data integration, recommendation systems, and artificial intelligence (AI), enabling computing systems to interpret and reason over complex datasets by leveraging the structured relationships between classes and instances.

In semantic search, knowledge graphs enhance traditional search engines through more sophisticated understanding and processing of queries. Instead of matching keywords alone, semantic search engines can understand the context and meaning behind search terms. For example, in a medical knowledge graph, a query for "treatment options for diabetes" can retrieve related results involving medications, lifestyle changes, and clinical trials by recognizing the relationships between "treatment," "disease," and "therapy" classes. This allows for more relevant, accurate search results based on semantic relationships rather than simple keyword matches.

In data integration, knowledge graphs are used to unify disparate data sources, such as across different domains, formats, and systems. A company might use a knowledge graph to combine information from customer databases, product catalogs, and transactional systems into a single, coherent structure. For instance, in enterprise resource planning (ERP) systems, data about products, suppliers, and contracts may be stored in separate systems. A knowledge graph allows these diverse data sources to be integrated into a unified framework, enabling cross-domain queries such as finding the best supplier based on product quality and delivery reliability. This is particularly important in large organizations, where data often exists in silos, making it difficult to obtain actionable insights without an overarching knowledge structure.

Knowledge graphs are also used in recommendation systems, where they enhance the relevance and precision of recommendations by leveraging relationships between users, products, and other entities. For example, in an e-commerce platform, a recommendation system built on a knowledge graph can suggest products not just based on what similar users have purchased, but also on deeper insights, such as the relationships between a user's favorite product categories and related brands, or even the user's purchasing behavior over time. This allows for, for example, recommending a camera based not just on past searches, but also considering the user's interests in outdoor activities, photography tutorials they have viewed, or related accessories they own.

In artificial intelligence (AI), knowledge graphs are used in machine reasoning and knowledge-based systems. For example, in natural language processing (NLP), AI systems can use knowledge graphs to better understand the context and relationships in human language. This helps systems to disambiguate meanings in complex sentences. A knowledge graph can allow an AI assistant to correctly interpret a question like "Who was the director of the movie about the sinking ship?" by understanding that "the sinking ship" refers to "Titanic," and retrieving the relevant information about its director, James Cameron.

However, the effectiveness of a knowledge graph is often contingent on the completeness, as well as the accuracy, of the information it contains. Missing property values for instances can degrade the quality and usefulness of a knowledge graph. For example, if an "Author" instance lacks an "affiliation" property, queries that rely on the "affiliation" information might yield incomplete or erroneous results. Inconsistent or incomplete data can also negatively impact downstream applications such as recommendation engines, predictive models, or data-driven decision-making tools.

In practice, missing values in a knowledge graph can arise for various reasons, such as incomplete data sources, delays in data updates, or integration challenges when combining multiple datasets. This problem becomes particularly challenging when there is high variability in property completeness across instances within the same class. For example, in a class of "Authors," some instances may have complete sets of properties (e.g., "affiliation," "email," "publication count"), while others may lack several key properties. This intra-class variability can lead to unreliable results, as certain instances may be over-represented or under-represented in query results due to their relative completeness.

Similarly, inter-class variability—where the completeness of properties varies between different classes—can present additional challenges. In a knowledge graph that contains both "Authors" and "Publications" classes, the "Author" class may have high completeness for most instances, while the "Publication" class may have significant gaps in key properties such as "publication date" or "journal". Such class-level variability can skew analysis, impact reasoning capabilities, and undermine the accuracy of queries or inferencing performed over the graph.

This variability, whether within a single class (intra-class) or between different classes (inter-class), can significantly affect the reliability and accuracy of query results and reasoning processes within the knowledge graph. In both cases, instances or classes with more complete properties may be over-represented in responses, while those with missing or incomplete data may be under-represented or entirely excluded, regardless of their actual relevance. This can lead to biased or skewed outputs, where completeness rather than actual relevance influences the results, thereby undermining the effectiveness of systems that rely on the knowledge graph for accurate querying, analysis, or inferencing. The overall reliability of the query results may be reduced.

The present disclosure provides techniques and solutions to provide information regarding the completeness, and variability of completeness of different class in a knowledge graph, or other collections of instances, as well as providing information regarding completeness and variability between instances in a single class.

In one technique, missing property information is determined using an ontology defined for use with the knowledge graph. In particular, a metric for use of an instance property within a particular class can be determined based on a number of class instances where values for the property are provided and a total number of class instances. An overall completeness metric for the class can be determined by summing the use metrics for the individual properties and the total number of properties for the class. The completeness metric for the class can be represent an expected completeness for class instances, where individual instances can satisfy the expected completeness, or have a lower number or a higher number of filled property values than expected.

Information for individual instances can also be determined, such as an actual completeness for an instance, which can be calculated in a similar manner as the class completeness metrics, based on the number of filled properties for the instance and the number of properties in a class. A completeness score can represent how a given instance compares with the expected class completeness. The score represents, as discussed earlier, whether a given instance has the expected number of filled properties for instances of the class, or has a higher or lower number of filled properties.

In another technique of the present disclosure, class and instance completeness metrics can be determined using information regarding user requests for instance property values. Usage information-based metrics can be useful when an ontology is not available. Usage-based techniques can also be advantageous because they provide information about what properties users consider to be the most important. Ontology-based techniques can be useful when usage data together. Having both ontological and usage-based information can be particularly beneficial, as it can help ensure that all properties are considered, where the ontology defines the relevant properties, while the usage data provides information as to what properties are actually most important to users.

Information regarding user queries may be obtained from a variety of sources, such as from logs of knowledge graph queries, including in computing languages such as SPARQL. SPARQL queries can include those that were mapped from a natural language interface. Natural language queries can also be logged and used as a source of user request information, even if not mapped to SPARQL queries.

From the user request information, a number of requests for a particular property of an instance can be determined, including for both filled properties and unfilled properties. Whether properties were filled or unfilled can be determined from a knowledge graph or from the query logs. For example, a missing property value can be identified if a query provided a failure or error indicator, or did not return a result. The overall number of requests for an instance, regardless of requested property, can also be determined, as can the overall number of requests for a particular class or requests for an entire system, such as for all classes in a knowledge graph or other collection of instances.

An instance importance metric can be calculated from this information, where the importance of a particular instance is based on a number of requests received for the instance and the number of overall system requests. Request information for an instance and the instance importance metric can be used to calculate a property request score for the instance, which scales the total number of requests for a property of an instance by how important the instance is, as determined based on the number of requests for the instance compared with the overall number of requests received for the system. If multiple graphs, or multiple instances of the same graph are used, the property request score can be normalized by dividing the property request score for the instance by the total number of requests received for information from the knowledge graph.

Information regarding the analyses can be provided in a number of ways, such as a heat map that provides information about expected class completeness in a knowledge graph, or a particular subset (subgraph, such as a topic cluster) of the knowledge graph. Heatmaps can also be used to identify important instances or classes, such as using the property request score.

The disclosed techniques provide a number of advantages. By identifying areas where a knowledge graph is incomplete, efforts can be made to fill in missing property values and improve the quality of the knowledge graphs. As described above, this can lead to more accurate knowledge graph query results, such as semantic search results. Further, when user request information is available, efforts to improve the quality of the knowledge graph can be targeted to classes and instances of the highest interest to users or computing processes.

Knowledge graph analysis can also be used in guiding computing processes. For example if a query is determined to request properties for a particular class, and multiple knowledge graphs are available, the completeness metrics can be used to route the query to a knowledge graph that has higher completeness metric for the class, or even specific class properties, providing improved query accuracy.

The disclosed techniques can also be applied to enhance machine learning (ML) scenarios and other uses of knowledge graphs by identifying and using high-quality parts of a knowledge graph (where high-quality refers to sections that are identified by one or more metrics as more complete than other sections). For instance, incomplete or low-quality sections of the graph can be removed before training machine learning models, such that only the most relevant and complete data is used, and enhancing graph quality. This process, known as graph pruning, can improve the performance and accuracy of machine learning by reducing noise and focusing on high-quality data (again, indicated by higher completeness metric values). Additionally, graph pruning can be applied prior to other uses of the knowledge graph, such as in data integration or semantic search, which can enhance the overall quality and reliability of search results.

Downsampling techniques can be used to manage performance-intensive applications by selectively reducing the size of the knowledge graph. This can involve completely avoiding the processing of certain less complete sections of the graph, thereby ignoring these areas during performance-intensive tasks such as rendering or complex query processing. Unlike pruning, the data remains available, and particularly programmatic logic can determine when, and to what degree, downsampling should be used.

Alternatively, downsampling can involve analyzing less complete sections, but with a reduced focus, meaning fewer instances from these areas are processed compared to more complete sections. This selective reduction maintains the structure and information of the graph while optimizing it for specific tasks, such as rendering or model training. For example, in a scenario where rendering a large knowledge graph is computationally expensive, downsampling can help by thinning the graph to include only the nodes and edges for more complete sections of the graph, making it feasible to render without compromising the overall integrity of the graph.

The techniques can also be used in recommendation and ranking algorithms. By determining the most complete and relevant instances or properties, a system can prioritize what information to display and in what order. This can enhance user experience in visualization software by presenting the most pertinent data first, thereby improving the efficiency and effectiveness of data exploration and decision-making processes. For instance, in a cybersecurity threat detection system, a recommendation engine can prioritize and suggest threat mitigation strategies based on the completeness of the knowledge graph. If a user queries about a specific type of threat, the system can recommend mitigation strategies that are backed by the most complete and comprehensive data. This approach helps provide more accurate and reliable recommendations to users, enhancing the overall effectiveness of the threat detection and response system.

Example 2)—Knowledge Graphs and Ontologies

Ontologies are important to a variety of computer implemented processes. For example, ontologies can be used in linking data in the Semantic Web, in natural language processing, in query processing (such as by converting concepts into SQL), and data integration (integrating data having a common semantic concept). Further, ontologies can be used in artificial intelligence systems, including large language models, the use of which is currently undergoing explosive growth.

A knowledge graph represents data in a graph format where entities are represented as nodes, and relationships between these entities are depicted as edges. Each entity (also referred to as an instance of a class, with classes and associated properties typically defined in an ontology) in a knowledge graph can represent a person, place, object, concept, or thing, and the relationships between these entities define how they are connected or related. For example, in a corporate environment, a knowledge graph might include entities such as particular employees, departments, and projects, with corresponding classes, and relationships (which can also be defined in the ontology, at least at the class level) like "works in," "reports to," or "manages" connecting these entities. This graph structure allows complex, interconnected data to be represented flexibly, making it easier for organizations to store, query, and derive insights from their data.

A key feature of a knowledge graph is its ability to capture complex relationships in a structured yet flexible manner. These relationships can be hierarchical, associative, or descriptive, depending on the domain of the graph. Knowledge graphs often utilize formalized formats such as the Resource Description Framework (RDF) to structure their data. RDF represents knowledge as triples, where each triple consists of a subject, predicate, and object, forming the basis of how relationships are expressed in the graph. For example, a triple like "John worksFor CompanyA" would describe a relationship between the entity "John" and the entity "CompanyA" via the predicate "worksFor." RDF; s flexibility allows it to represent not only basic relationships but also more intricate patterns. Additionally, RDF's compatibility with SPARQL (a powerful query language) enables efficient querying of the graph for specific data or relationships, allowing semantic reasoning and analysis over the stored data.

Knowledge graphs can be manually constructed or generated automatically through processes such as information extraction from structured or unstructured data sources. As the knowledge graph grows, it can integrate multiple datasets, adding new entities and relationships to the graph. For example, a corporate knowledge graph might begin with employee records but later expand to incorporate customer data, product specifications, and sales records, creating a holistic representation of enterprise data that can be queried and analyzed in context. The graph's structure and the relationships it captures enable advanced applications such as recommendation systems, semantic search, and data integration across various systems.

Ontologies serve as a formal framework that defines the structure of a knowledge graph by specifying the categories of entities, relationships, and properties that exist within the graph. An ontology provides a schema or blueprint for how data is to be organized, ensuring consistency across different datasets and allowing systems to understand the semantics of the data being represented. By defining relationships between entities, ontologies enable more accurate queries and deeper reasoning across datasets.

Ontologies are typically composed of classes, properties, and relationships. Classes represent categories of entities. For example, a "Person" class might represent all human entities, while a "Company" class could represent business organizations. Properties describe the attributes or characteristics of a class. For instance, a "Person" can have properties such as "name," "age," and "address," while a "Company" might have properties like "name," "location," and "industry." Relationships define how different entities are connected. For example, a "Person" entity can be linked to a "Company" through the relationship "employeeOf," indicating an employment relationship between the two entities.

The purpose of an ontology is to establish clear and formal definitions for how various types of data should be represented and organized. This clarity enables greater interoperability between different systems, allows for more accurate and meaningful querying of the data, and facilitates data integration. For example, in an enterprise setting, an ontology can help ensure that departments referring to the same concept, such as "employee," use consistent definitions and attributes across different systems. This consistency helps ensures that querying data or integrating datasets does not lead to misunderstandings or discrepancies.

Ontologies are often expressed using formal representations like RDF Schema (RDFS) or the Web Ontology Language (OWL). RDFS extends RDF by providing a schema for defining the classes and properties in a knowledge graph, while OWL allows for even more complex relationships and constraints, supporting inference and reasoning over the data. Both RDFS and OWL provide mechanisms for expressing relationships between classes, such as subclassing or equivalent classes, and for specifying constraints on properties, such as their domain and range. These features make ontologies not only a tool for defining data but also a means for enabling automated reasoning about the data, such as inferring new relationships or validating the consistency of the data model.

FIG. 1 illustrates the relationships between a knowledge graph 108, an ontology 110 that describes elements of the knowledge graph, and a meta-ontology 112 that provides a higher-level abstraction for the ontology. The knowledge graph 108 represents specific instances, while the ontology 110 provides a formal schema that describes the structure and relationships within the knowledge graph. Similarly, the meta-ontology 112 describes the conceptual structure of the ontology 110, allowing it to be applied across different domains. As the figure demonstrates, concepts progress from a more concrete perspective in the knowledge graph 108 to a more abstract, conceptual perspective in the meta-ontology 112.

In this example, the ontology 110 defines several classes 118, such as a general vehicle class 118a, and more specific classes like car 118b and motorcycle 118c. These classes categorize different types of entities within the domain represented by the knowledge graph. The ontology 110 also defines properties 122, which are attributes that can be associated with these classes or their instances. For example, an "isA" property 122a defines an instance as belonging to a specific class. Properties 122b and 122c define specific attributes, such as having a license plate 122b or an owner 122c.

The knowledge graph 108 contains instances 160 and 162 of these classes. For example, instance 160 may represent a specific vehicle that is categorized under the vehicle class 118a, while instance 162 may represent a specific motorcycle under the motorcycle class 118c. Each instance is associated with values for the properties defined in the ontology. For instance, instance 160 might have a specific license plate value 160a and an owner 160b, while instance 162 (the motorcycle) might have its own license plate value 162a and owner 162b. The relationships 170 in the knowledge graph link these instances to the corresponding classes and properties in the ontology. For example, a relationship 170 may associate instance 160 with the vehicle class 118a and its corresponding properties.

The meta-ontology 112 describes higher-level concepts that are used in the ontology 110. While the ontology 110 specifies particular classes 118, such as vehicles or motorcycles, the meta-ontology 112 describes the concept of a class itself, defining it at a more abstract level. Similarly, the meta-ontology defines the concept of properties and relationships, including those that define one object as an instance of another. The meta-ontology allows for the organization and management of multiple ontologies by providing a framework that governs how classes, properties, and relationships are structured. For instance, the meta-ontology 112 includes a class concept 150a, which defines what it means to be a class in the ontology, and the ontology 110 is itself considered an instance of the meta-ontology, as indicated by instance identifier 126.

In addition to defining the relationships between classes and properties, the ontology 110 also supports the concept of object and datatype properties. Object properties define relationships between different objects, which can also be referred to as instances, entities, or resources. For example, the relationship between a vehicle and its owner would be described as an object property. On the other hand, datatype properties associate objects with literal values, such as the license plate number of a vehicle or the age of a person. These properties are used for defining the detailed attributes of instances within the knowledge graph and ensuring that the data conforms to the structure defined by the ontology.

The hierarchical nature of FIG. 1 figure demonstrates how knowledge graphs, ontologies, and meta-ontologies work together to structure and interpret complex datasets. The knowledge graph 108 represents concrete data in the form of instances and their relationships. The ontology 110 provides the schema for organizing this data, ensuring consistency and enabling reasoning. The meta-ontology 112 abstracts these concepts further, allowing the system to manage ontologies across different domains while maintaining a unified framework for understanding the data.

Example 3)—Use of Ontology to Determine
Missing Property Values

Figure 2:
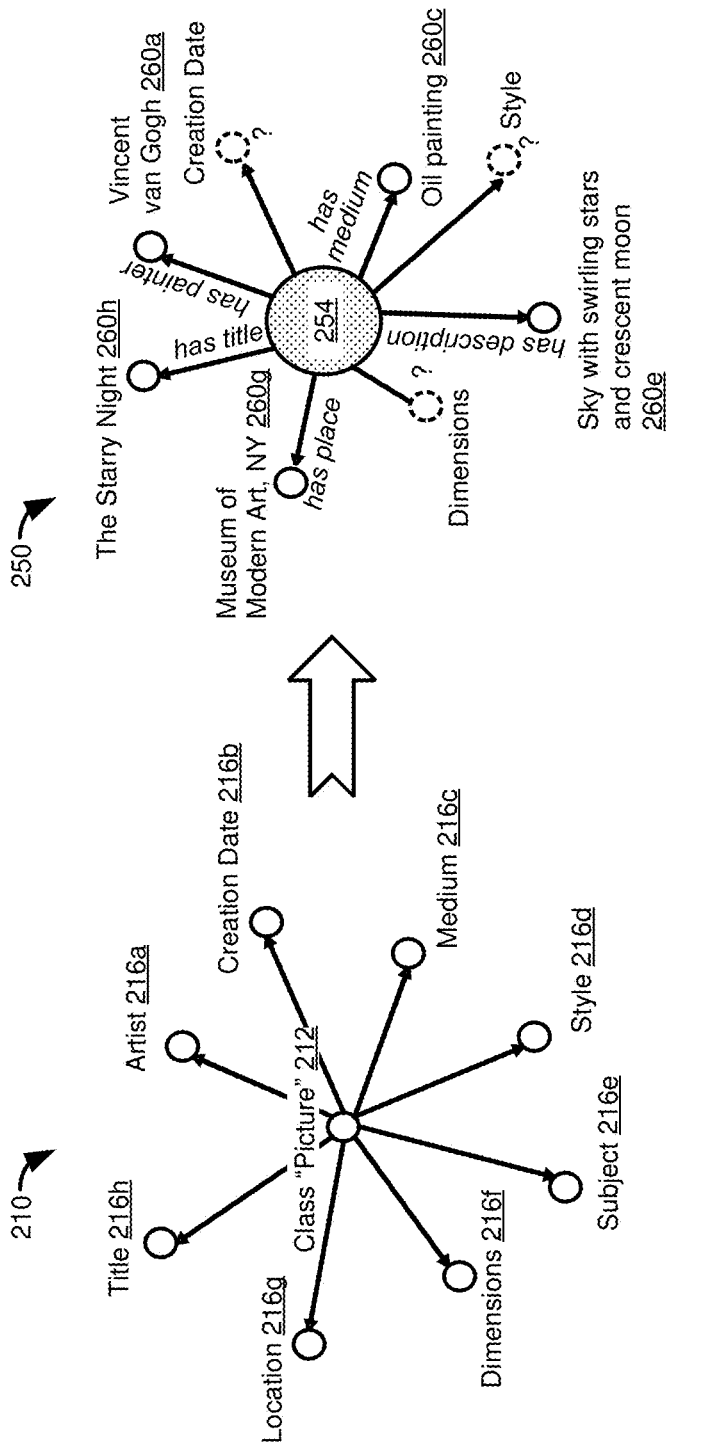
FIG. 2 illustrates an ontology for a class and how class instances can have values for one or more class properties that are missing from the instance information.

FIG. 2 illustrates an ontology 210, here representing a picture or painting, and a portion 250 of a knowledge graph that provides an instance of the ontology. A picture class 212 is defined by the ontology 210. The picture class 212 includes a variety of properties, shown as 216a-216h. Specifically, the properties include an identifier of an artist 216a who created the picture, a date 216b the picture was created, a media type 216c for the picture (such as photograph or oil painting), a style 216d (such as color field painting), a subject 216e (such as an identifier of a person whose portrait is represented in the picture, or another description objects, shapes, landscapes, or other visual elements), dimensions 216f, a location 216g of the picture, and a title 216h of the picture.

The portion of the knowledge graph 250 provides an instance 254 of the picture class, here the painting Starry Night by Vincent van Gogh. It can be seen that the instance includes values 260a, 260c, 260e, 260g, and 260h, corresponding to properties 216a, 216c, 216e, 216g, and 216h, but lacks values for properties 216b, 216d, and 216f.

Disclosed techniques allow for an ontology to be used to determine missing property values (referred to as datatype properties) and missing relations (referred to as object properties). To provide accurate results, the ontology is preferably up to date. Missing values can be found using this technique provided that the ontology defines the properties.

Different knowledge graph instances can commonly include, or omit, values for certain properties of the ontology, while in other cases properties being included or not included have greater variability. Disclosed techniques can process a knowledge graph and ontology to determine information about how frequently values are provided for particular properties in a set of analyzed instances. This information can then be used to analyze whether new or existing instances may be missing information. That is, if values for a property are consistently included, an instance that lacks a value for the property may be determined to have missing information. On the other hand, if values for a property are not consistently included, the property may be considered more of an "optional" property or otherwise as a property that is not expected for all instances.

A process for determining missing values can include a number of components. Overall, property usage for a particular class can be represented as $U_{PC}$. A count of instances where the property has a value, also referred to as being filled, can be represented as $C_{PI}$. The total number of class instances analyzed is represented as $N_I$. The property usage for the class can then be calculated as:

$$U_{PC} = \frac{C_{PI}}{N_I}$$

FIG. 3 illustrates an example data set 300, in the form of a table having a column 310a identifying an instance, a column 310b defining a brand of a vehicle, a column 310c identifying a vehicle model of an instance, and a column 310d providing the color of the vehicle instance. The data set 300 can be analyzed to determine the property usage for the class, here "vehicle." Specifically, consider the property usage for the color property. The number of instances where the color property has a value is eight, out of ten instances total. Thus, the quotient of the formula above is 0.8. Color can be determined to be present eighty percent of the time for the vehicle class, at least based on the data set 300 used to calculate property usage.

To analyze the completeness of an instance, $C_I$, the following equation can be used, where $AC_I$ is the actual completeness of the instance and $EC_C$ is the expected completeness of the class of the instance:

$$C_I = \frac{AC_I}{EC_C}$$

The expected completeness can be determined as the quotient of the sum of the property usage values, $U_{PC}$, for the properties of the class and the number of properties in the class, $N_P$, or:

$$EC_C = \frac{\sum U_{PC}}{|N_P|}$$

The actual completeness of the instance can be calculated as the quotient of the number of class properties that are filled for the instance, $N_{PF}$, and the number of properties of the class, $N_P$, or:

$$AC_I = \frac{|N_{PF}|}{|N_P|}$$

A practical example of how these equations can be used is described with respect to the example data set 400 of FIG. 4. The data set 400 is in the form of a table, having columns 410a-410d that correspond to columns 310a-310d of the data set 300 of FIG. 3, with an additional column 410e providing a mileage associated with a particular vehicle instance.

For the properties of brand and model, all instances have values for these properties, which thus each have a $U_{PC}$ of 1. For the properties of vehicle color and vehicle mileage, both properties are associated with a total number of 10 instances. For the color property, the number of vehicles that have the color property filled is 8, providing a value of 0.8 for $U_{(Color)(Vehicle)}$, while the number of instances that have mileage filled is 6, providing a value of 0.6 for $U_{(Mileage)(Vehicle)}$.

Now consider the completeness of a specific instance, such as the Tesla Model 3 instance. The actual property completeness for the Tesla instance, $AC_I$, is 0.5 (the quotient of the number of filled properties for the instance and the total number of properties). The expected completeness for the vehicle class, $EC_{Vehicle}$ is the quotient of the sum of the property use values for the class properties (1+1+0.8+0.65) and the number of instance properties (4), providing an expected completeness of 0.85, or 85%.

From the equation above, the completeness, $AC_{(Tesla)}$, is the quotient of the instance completeness (0.5) and the expected completeness for class instances (0.85), providing a value of 0.58. Since 0.58 is lower than 0.85, the Tesla instance is less complete than would be expected for vehicle class instances.

It should be noted that class instances can have completeness values that are greater than 1, since an instance can have more properties filled than would be expected for an instance of the class.

Figure 5:
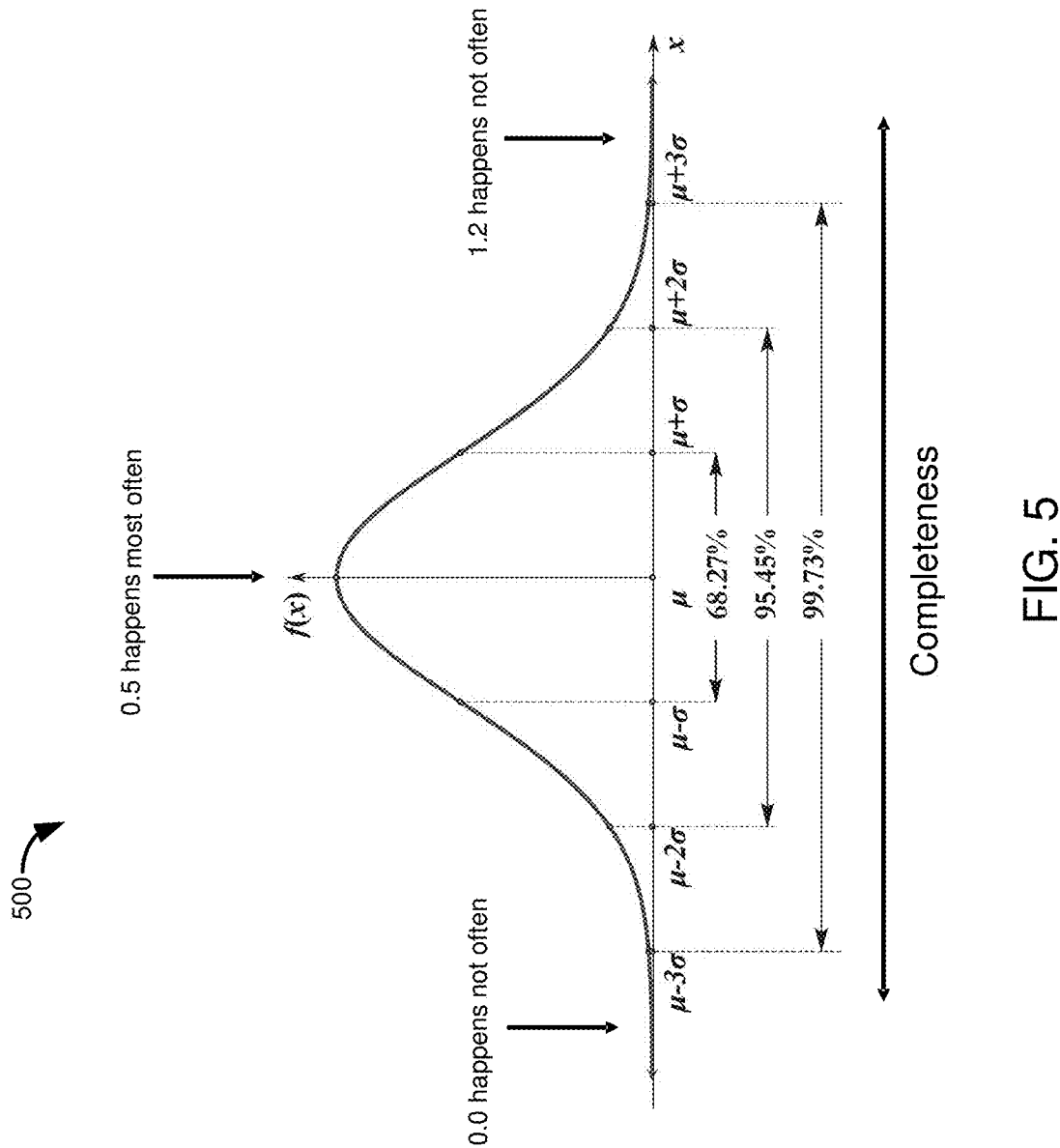
FIG. 5 is a graph illustrating how instance completeness for a class can vary.

Completeness values for the other class instances in the data set 400 can be calculated in an analogous manner. The values for the instances can be evaluated to determine statistical measures for the set of instances, such as a distribution (including based on standard deviation), as illustrated in the graph 500 of FIG. 5. The statistical measure can help provide quality information for a data set, as well as when evaluating instances that were not part of the data set 400. For example, a data set with low variance may be considered as preferable to a data set with high variance. That is, it may be preferred that instances generally have roughly the same amount of information as reflected by property values for class properties.

High variance can lead to skewed results. For example, if there is high variance, there may be instances with no or very few property values completed. Among other things, this may result in an overly low completeness rate. In these cases, analysis properties, like expected completeness for class instances, can be calculated excluding some instances. In some cases, for example, instances in the class can be analyzed, and those having a completeness level that varies significantly more than a mean or median value, such as being more than one or two standard deviations away from such value, can be omitted from the set and the remaining set of instances can be reanalyzed to generate metrics such as expected completeness rate.

Example 4)—Example Determination of Missing
Property Values from Comparison of Multiple
Instances In the technique of Example 3, it is assumed that an
ontology is available, including an ontology that is deduced
from a set of instances, where class discovery and property
discovery processes can be used.

Figure 6:
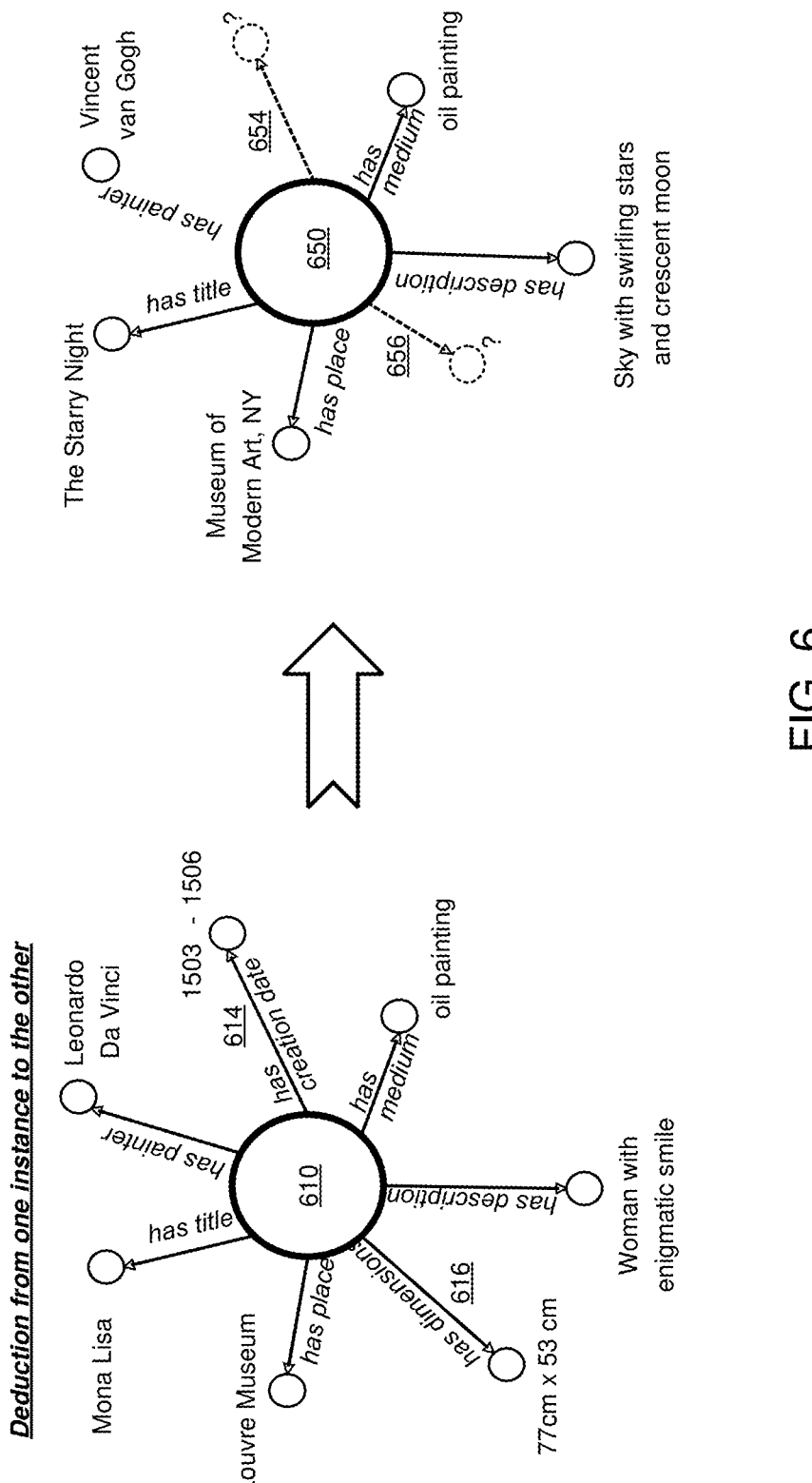
FIG. 6 is a diagram illustrating how missing properties can be determined by comparing multiple class instances.

In other scenarios, other techniques can be used to deter-
mine what properties are typically associated with class
instances. FIG. 6 illustrates two instances 610, 650 that are
either explicitly part of the same class or can otherwise be
deduced as being of a common group. For example, data
created by particular code functionality or applications can
be considered to be the same group. In terms of code
functionality, instances can be considered to be part of the
same class when they have the same object type (such as
being instances of the same computing object class, an
abstract data type), or the same value for a particular data
member of the object type (where the data member identifies
class type).

It can be seen that the instance 610 has property values for
properties 614, 616, where these properties are not present
for the instance 650, as indicated by properties 654, 656. In
the absence of an ontology, it may not be determinable just
from looking at the instance 650 that the instance should
have properties 614, 616, and thus that the properties are
missing. However, comparing instances can identify prop-
erties that are in some instances and not in others, which can
be used to create a larger set of expected properties. Tech-
niques can be used to determine when a property is an
expected property, such as by identifying a percentage of
instances in a set of instances that have values for the
property.

The determination of expected properties and the level of
completeness for individual instances can then be performed
as described in Example 3. Returning to FIG. 6, that the
instance 610 has the properties 614, 616 can be used to
determine that the instance 650 is missing values for those
properties, represented as 654, 656.

Example 5)—Example Determination Missing
Property Values from Usage Information

Figure 7:
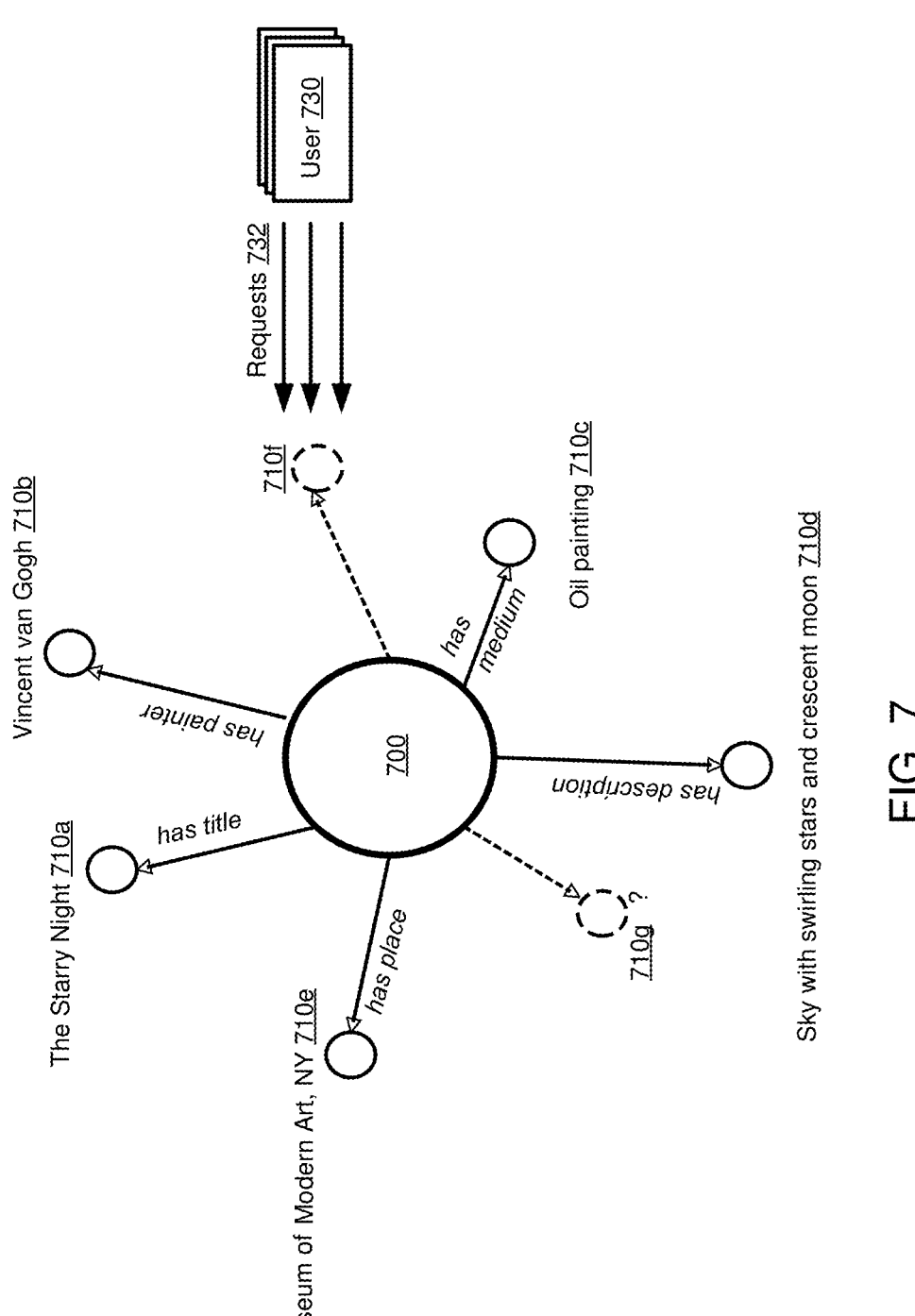
FIG. 7 is a diagram illustrating how user requests can be used to identify missing instance feature values.

Another technique to identify missing information, such
as values for class properties, can be based on analyzing user
requests. FIG. 7 illustrates this at a high level, where an
instance 700 has properties and corresponding property
values 710a-710e. However, the instance is also represented
as having missing values for properties 710f and 710g. As in
Example 4, without an ontology, it may be more difficult to
determine that the instance 700 is not associated with some
properties that are expected properties of the class.

FIG. 7 illustrates a plurality of user requests 732 from
users 730 for the property 710f. That many users 730 request
a value for a particular property, even if the requests are 732
unsuccessful, can indicate that the property is property that
users expect the class instance to have, with a value appro-
priate for a given class instance.

User requests 732 can be from a variety of sources,
including technical queries using languages such as
SPARQL. In other cases, a program may provide a natural
language interface that may or may not get translated to a
technical query. Information in these natural language
requests can also be used to identify property requests.

Figure 8:
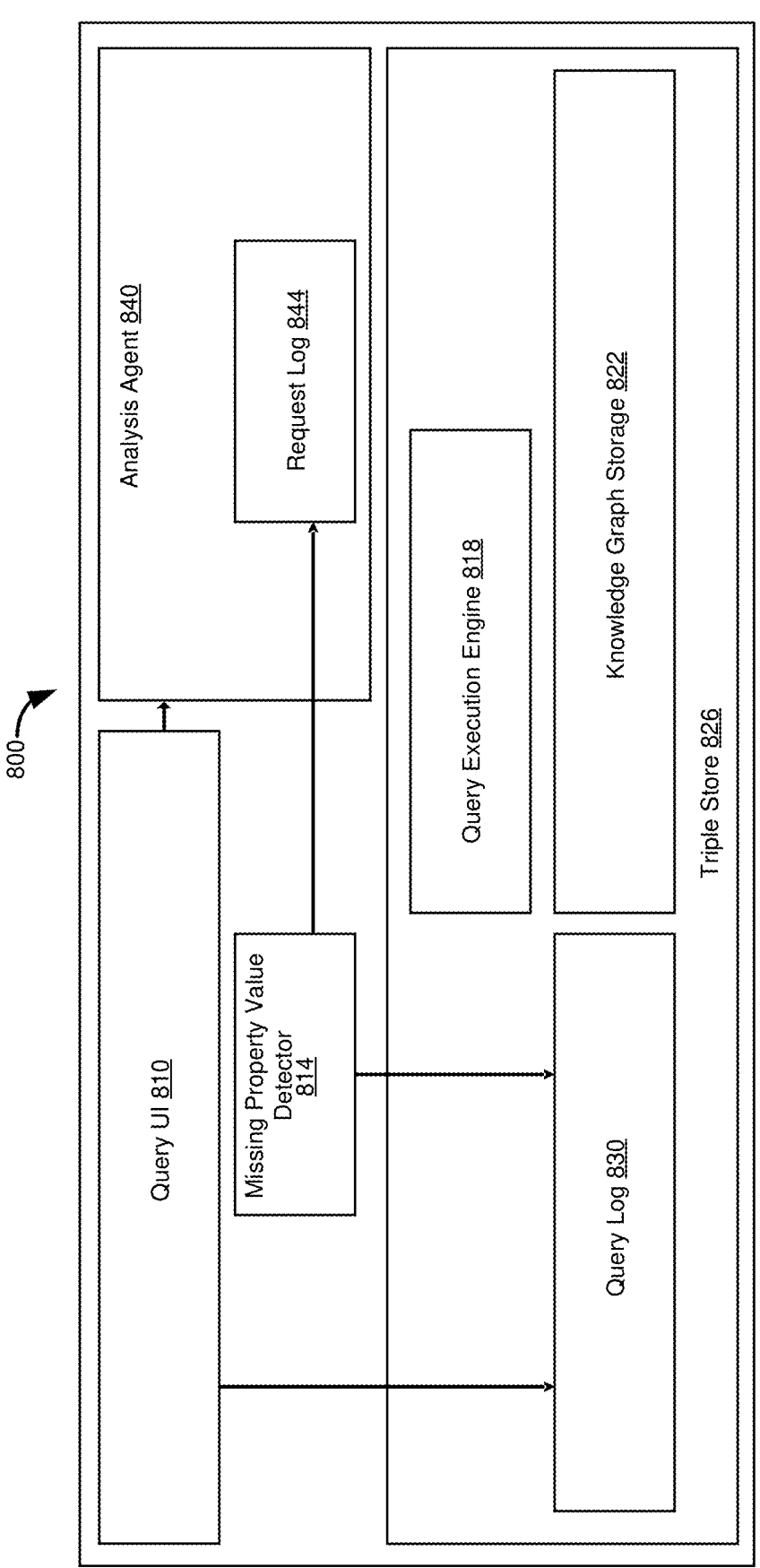
FIG. 8 is a diagram of an example computing environment for performing usage-based analysis of knowledge graph completeness.

FIG. 8 illustrates a computing environment 800 that can
be used to identify missing property values based on user requests. The computing environment 800 includes a query
user interface 810. The query user interface 810 can be an
interface that allows for entry of technical queries, or an
interface configured to receive and process natural language
queries.

The computing environment 800 includes a missing prop-
erty value detector 814. The missing property value detector
814 calculates and stores the number of requests for a
property that is not filled. Typically, this information is
stored on a per-instance basis. The information can be stored
in a format such as Map<Tuple (instance, property), Inte-
ger>.

Figure 9:
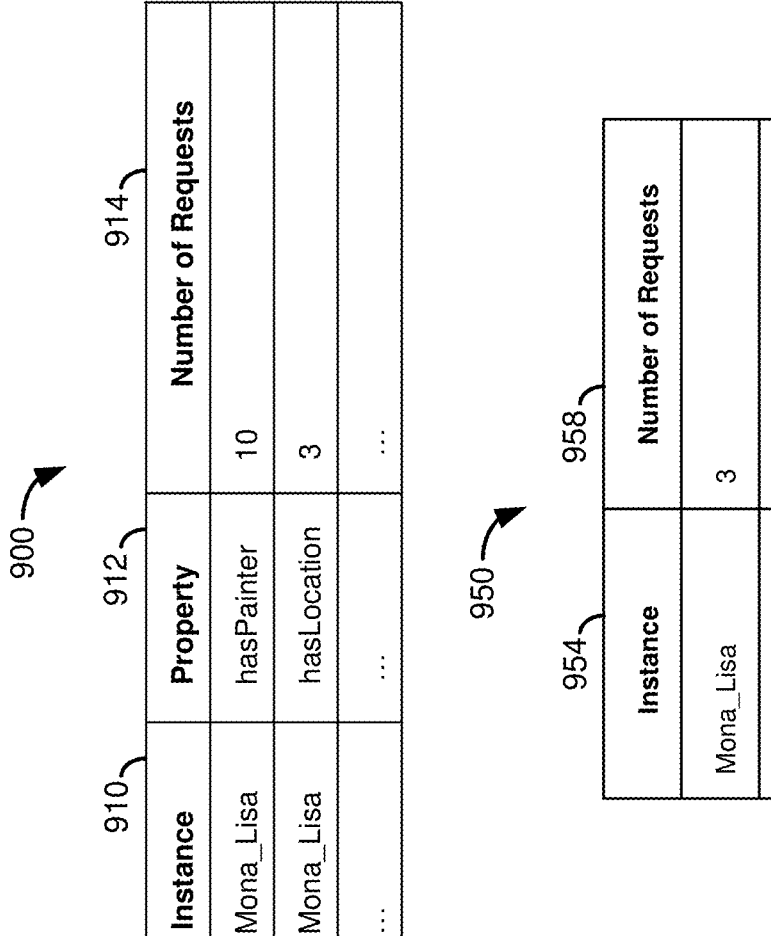
FIG. 9 provides example table representations of instance or instance property use information.
Figure 14:
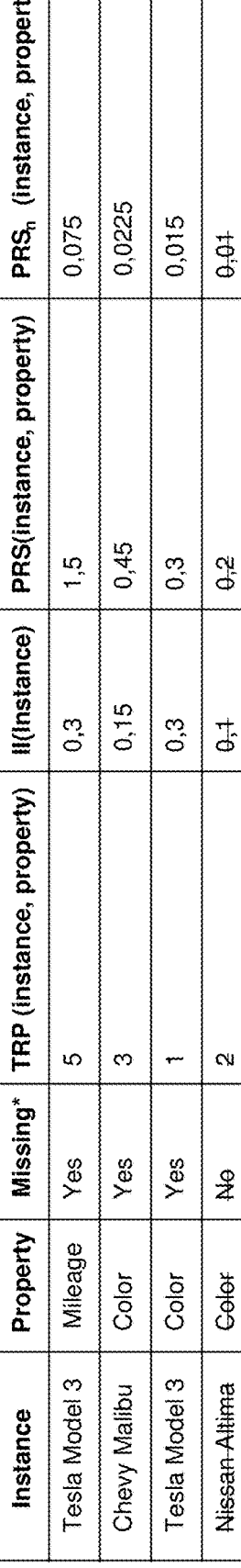
FIG. 14 further filters the filtered entries of the data set of FIG. 13, only including instance information with missing property values.

In other implementations, this information can be stored
in a relational database table, such as the table 900 of FIG.
9. The table 900 has a column 910 identifying a particular
instance whose data is represented in a row, a column 912
indicating a particular property associated with the instance,
or the class of which the instance is a member, and a column
914 indicating a number of requests that have been received
for the property where the value for the property was
missing from the instance.

The missing property value detector 814 can also store
information regarding a total number of requests received
for each instance, such as Map<instance, Integer>, where
the integer is the number of requests received for this
instance. In another implementation, the information can be
stored in a relational database table, such as the table 950 of
FIG. 9. The table 950 includes a column 954 identifying the
instance and a column 958 providing the number of requests
received for an instance.

The missing property value detector 814 can also track a
total number of requests received for a set of instances, such
as instances associated with a particular knowledge graph.
The total number of requests can be implemented as a
counter variable that is incremented when a new request is
received.

Queries provided through the query user interface 810 can
be processed by a query execution engine 818, such as a
SPARQL engine. The queries access information in a knowl-
edge graph store 822, which can be part of a triple store
(such as for RDF triples) 826 that also includes the query
execution engine 818. That is, the triple store 826 can be a
graph database system. The knowledge graph storage 822
can store class, property, and instance information as RDF
triples.

As part of query execution, the query execution engine
818 can cause entries to be made in a query log 830 of the
triple store 826. The query log 830 can include information
such as classes or instances used in a query, including
requests for values of specific properties, and can also
provide information regarding query execution, such as
whether a given query returned results, indicating that
property values were identified, or if property values were
not returned, indicating that the knowledge graph storage
822 did not include the requested information.

An analysis agent 840 can work with the missing property
value detector 814 to process logs of the query log 830 to
provide a request log 844. The request log 844 can corre-
spond to specific query options that request property values.
For example, a larger query reflected in the query log 830
can be analyzed for individual property value requests,
including whether or not missing values were present, and
this processed information can be stored in the request log
844. The analysis agent 840 can also perform operations
such as obtaining a current count of the total number of queries processed by the triple store 826, such as for a particular knowledge graph of the knowledge graph storage 822.

The missing value property detector 814 can calculate values related to missing property values. The values can be calculated live, or in batch mode, and can access various logs. In particular, a technical query processing component, such as for processing SPARQL queries, can store the queries as triples (such as RDF triples). If the computing environment 800 provides a query user interface 810 that accepts natural language queries that are not mapped to SPARQL queries, logs for the natural language queries can be processed to extract request information that can be used in the calculations made by the missing property value detector 814.

Calculations that can be performed by the missing property value detector 814 include calculating the total number of requests for the property, TRP (instance, property). As noted, the calculations also include calculating the total number of requests (TR) received for a collection of instances. Calculations can also use a metric II (Instance) that measures the importance of an instance.

A property request score, PRS, represents a weighted version of the TRP, weighted by the instance importance II (instance) as:

$$\text{Score PRS(instance,property)}=\text{TRP(instance,property)}*\text{II(instance)}.$$

The instance importance can be calculated as the quotient of TRI (the total number of requests for the instance) and the TR (the total number of requests).

Although described as using single collections of instances, such as knowledge graphs, information from multiple collections or knowledge graphs can be combined for analysis. In this case, it can be useful to normalize the property request scores, as the quotient of the PRS score of a particular knowledge graph or other instance collection and the total number of requests received for all of the knowledge graphs or other instance collections being combined.

As an example of how user requests can be used to determine missing property information, consider again the example data set 400 of FIG. 4. FIG. 10 provides a table 1000 that contains data regarding user requests. A column 1010*a* identifies a request number and a column 1010*b* provides the content of the user request. The column 1010*a* can be used to determine a total number of requests received, in this case 20. That is, the table 1000 can store information for all queries, regardless of whether a property value was found that was responsive to the query.

Each request in the table 1000 requests a value of a single property for an instance having a specified vehicle manufacturer and vehicle model. A single user request can also include requests for multiple properties of a single instance. In some implementations, these requests that include multiple properties can be split into separate requests, each requesting a single property value. Since requests may be tracked on a per-property basis, each individual request generated from a query with multiple property requests can be considered as a separate request, for purposes of counting a number of requests for a property value.

In other cases, information can be maintained about the multiple properties that were requested in the original request. This information can be useful, for example, as in some cases correlations between property value requests can help determine whether properties are missing. For example, it may be that if two properties are typically requested in a query, it may be more likely that one of those properties is a missing property value if a value is provided for another of the properties represented in the same query.

FIG. 11 provides a table 1100 that illustrates how instance important values can be calculated. The table 1100 includes a column 1110*a* identifying an instance, a column 1110*b* identifying a number of requests received for a given instance, and a column 1110*c* that provides the instance importance calculation and result. The queries in the table 1100 can represent all queries—those for which property values were identified and those where property values were not present.

FIGS. 12A and 12B illustrate a table 1200 that includes calculation results for the vehicle instances in the data set 400 of FIG. 4. In this case, the relevant properties are color and mileage. The table 1200 includes a column 1210*a* identifying the instance of a given row, a column 1210*b* indicating the relevant property, a column 1210*c* indicating whether the relevant property is missing for a given instance, a column 1210*d* that provides the total requests for a given property for a given instance (TRP (instance, property), a column 1210*e* that provides the instance importance II (instance) value, a column 1210*f* that includes the property request score (PRS (instance, property), and a column 1210*g* that provides the normalized property request score).

In some cases, it may be desirable to filter analysis results to obtain information regarding properties that are most important to users, as indicated by the number of user requests submitted for property values. FIG. 13 provides a table 1300, having columns 1310*a*-1310*g* that correspond to the columns 1210*a*-1210*g*, that includes the top four properties of the table 1200, based on the total requests for a property, by instance (TRP (instance, property).

The table 1300 also illustrates the effect of instance importance (II (instance)) on frequency request scores. For example, row 1320*a* of the table 1300, requesting the color of a Nissan Altima, has a TRP value of 2, which is double that of the TRP value of 1 for the Tesla Model 3 represented in row 1320*b*. However, the II (instance) value of the Tesla Model 3 is 0.3, which is three times the II (instance) value for the Nissan Altima. This is reflected in the PRS scores, where the Tesla Model 3 has a score of 0.3, compared with 0.2 for the Nissan Altima.

In many cases, it may be of particular interest to focus on information that may be missing from an instance or a collection of instances. Accordingly, the table 1300 can be filtered to provide the table 1400 of FIG. 4, which only lists instance and instance properties that are missing for a respective instance.

Figure 15:
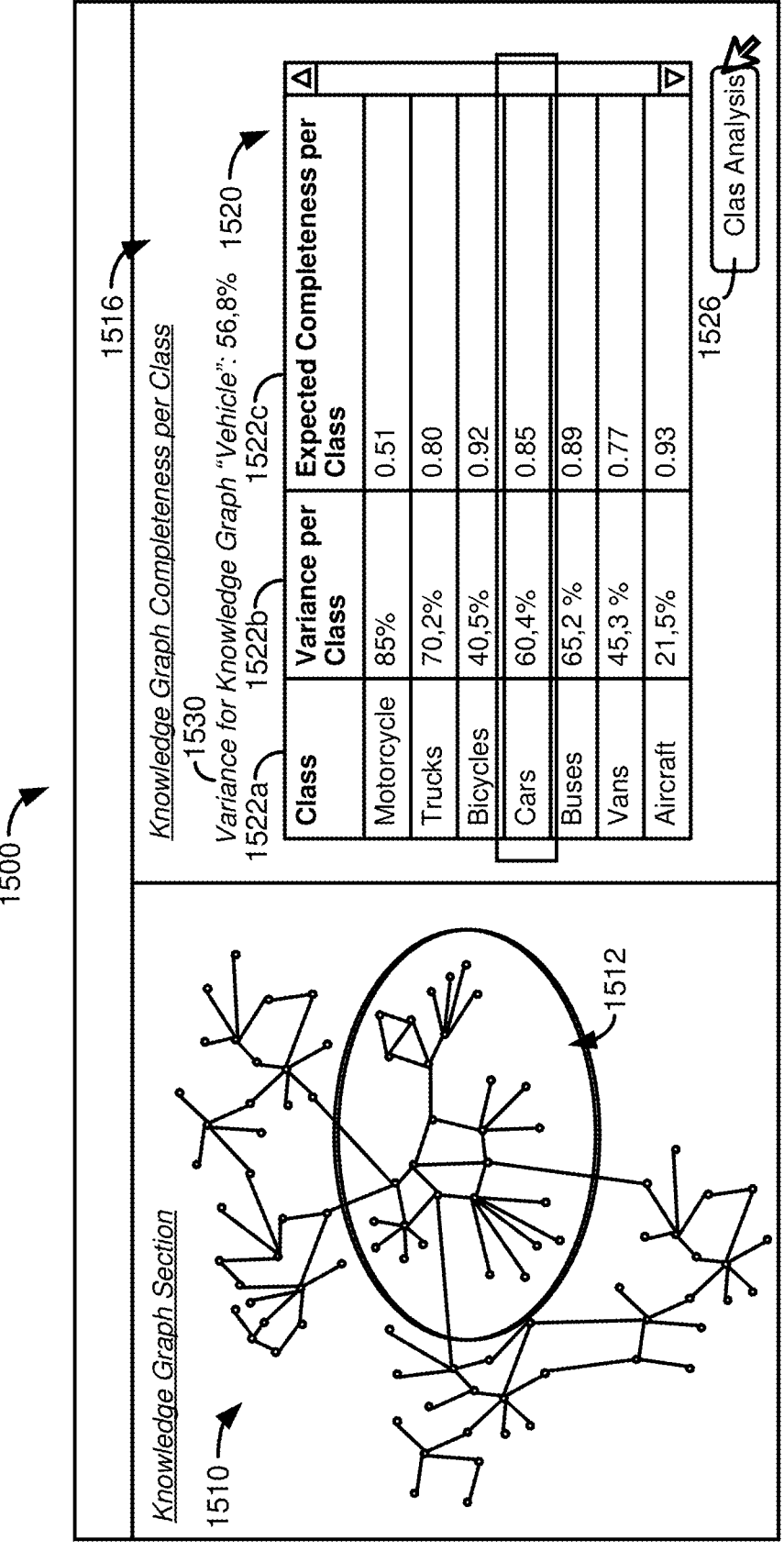
FIG. 15 is an example user interface displaying class completeness information.

Example 6)—Example User Interface Providing Missing Property Value Analysis Results FIGS. 15-19 provide user interfaces for viewing results of instance property analysis. FIG. 15 provides a user interface 1500 that provides completeness information for various classes in a collection of instances. In particular, FIG. 15 illustrates a knowledge graph 1510, and a portion 1512 of the knowledge graph for which analysis has been performed and results are displayed in panel 1516. The panel 1516 includes a table 1520 that includes a column 1522*a* identifying the relevant class of a given row, a column 1522*b* identifying the observed variance for the class in the analyzed data set, and a column 1522*c* that provides the expected property completeness for the class. A user can select a particular row of the table, a particular class, and then choose to view more detailed information by selecting user interface element 1526.

The information about class variance can be used to assess the quality of a set of instances, as well as to identify areas where efforts should be focused to improve the quality of a set of instances. As an example, if two knowledge graphs are being considered for use, information such as presented in FIG. 15 can be used to assess the quality of the knowledge graphs, where typically the knowledge graph having lower class variance and higher expected class completeness is a higher quality knowledge graph. FIG. 15 also illustrates the average variance 1530 for all classes in the selected knowledge graph section. This information can be useful when comparing two topic areas of two knowledge graphs, as well as getting a sense of the "quality" of various topic areas of a knowledge graph. Average variances for the overall knowledge graph can also be determined and provided on the user interface 1500.

Figure 16:
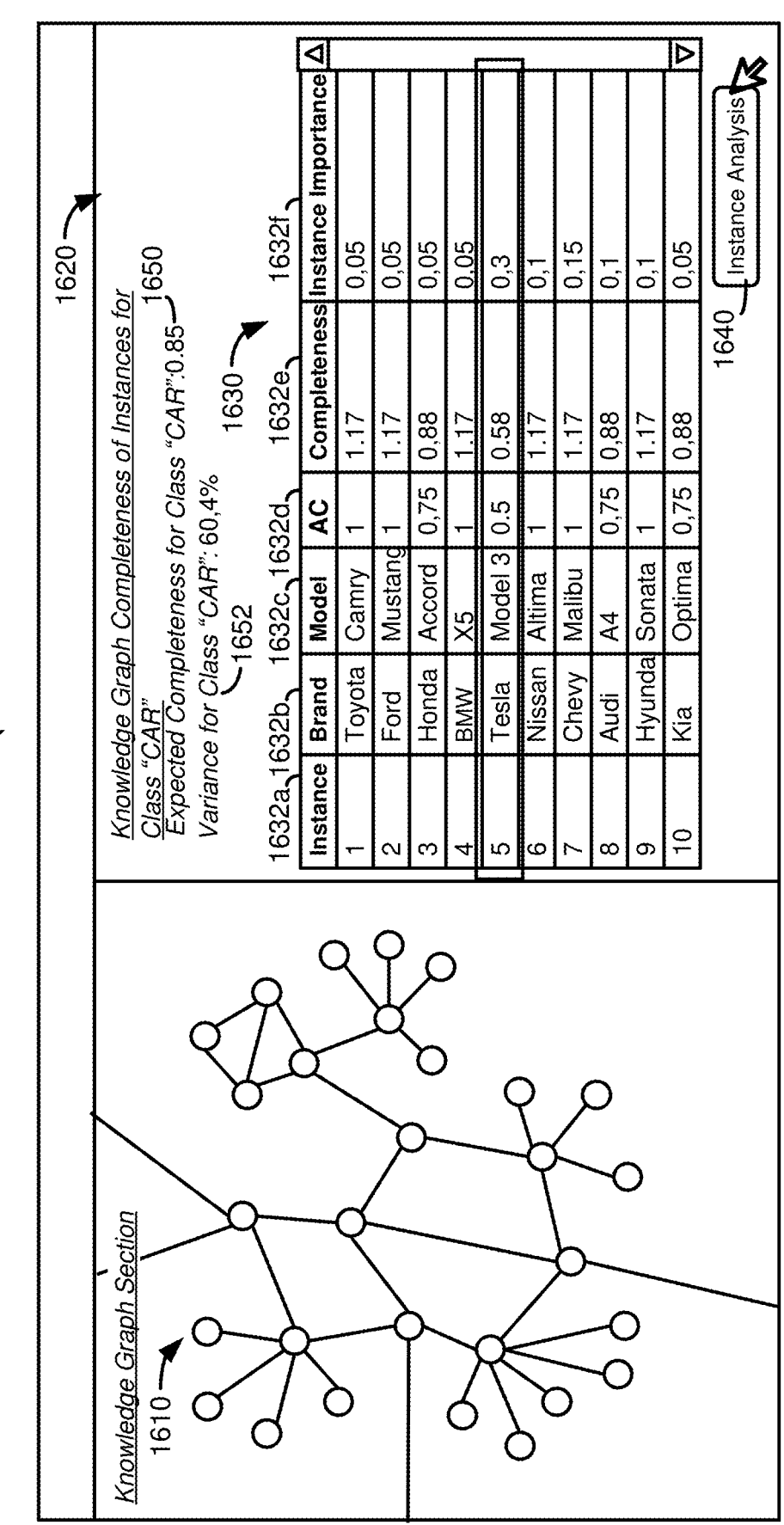
FIG. 16 is an example user interface displaying instance completeness information for a class.

FIG. 16 provides a user interface 1600 that provides information regarding property completeness for a specific class. For example, the user interface 1600 can represent a user interface that is displayed after selecting the car class and then activating the user interface element 1526 of the user interface 1500.

The user interface 1600 provides a representation 1610 of the knowledge graph 1510, which can represent a further subset of the portion 1512 of the knowledge graph. In some implementations, the representation 1610 can correspond to class and class properties. In other implementations the representation 1610 can correspond to, or include, information for individual instances of a particular knowledge graph class.

In a panel 1620, the user interface 1600 includes a table 1630 providing property completeness information for individual instances of the car class. The table 1630 includes a column 1632a that includes a numerical identifier for an instance of the car class, a column 1632b identifying a brand of a particular car instance, and a column 1632c identifying a particular model of a car instance. Analysis metrics are provided in the remaining columns, including an actual completeness for the instance in column 1632d, a completeness score for the instance in column 1632e (which accounts for the expected completeness for instances of the car class), and a column 1632f that provides the instance importance value for the particular instance.

The information in the table 1630 illustrates how instances can have completeness scores, in column 1632e, that are greater than one. Again, a score of 1 indicates that an instance has the same actual completeness as the expected completeness, and values higher than 1 indicate that an instance is more complete than would be expected.

A user can select a row of the table 1630 and choose to view more detailed information about an instance by selecting user interface element 1640.

The panel 1620 also displays the expected completeness 1650 for instances of the car class, as well as the observed variance 1652 for analyzed car class instances. Note that these values can represent values for different data sets. For example, the expected completeness can be calculated from one data set and used to evaluate other instances or sets of instances, and the variance can be for those additional instances.

Figure 17:
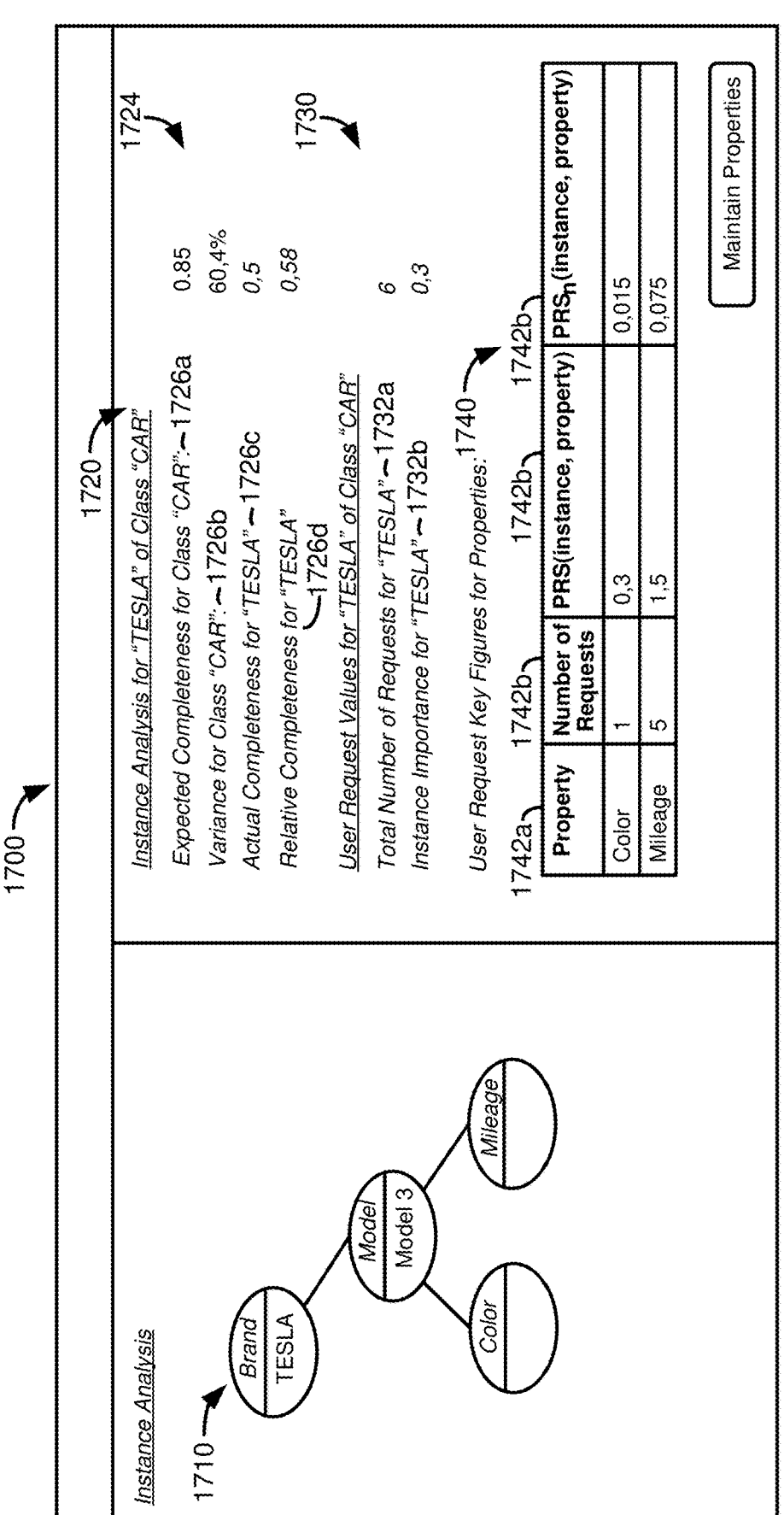
FIG. 17 is an example user interface displaying class and instance completeness information for an instance, as well property usage information and metrics for class properties.

A user can select a particular instance, row of the table, to analyze more specifically by selecting user interface element 1640, which can cause a user interface 1700 of FIG. 17 to be displayed.

The user interface 1700 of FIG. 17 provides a graph 1710 of the specific instance selected for analysis, including showing both properties with filled property values and properties that are unfilled.

A panel 1720 provides more information about the selected instance, including comparative information, such as class wide metrics. Instance analysis information 1724 can include the expected completeness 1726a for the car class, the instance variance 1726b for the car class, the actual completeness 1726c for the selected instance, and the relative completeness 1726d for the selected instance (which takes into account the expected completeness).

Information 1730 about user requests for properties of the instance is also provided in the panel 1720. The user request information 1730 includes a total number of requests 1732a for properties of the instance, and the calculated instance importance 1732b.

A table 1740 of the panel 1720 provides more detailed information regarding user requests. A column 1742a of the table 1740 identifies the relevant property, column 1742b provides the number of user requests for the property, column 1742c provides the property request score (PRS (instance, property) for the property, and a column 1740d includes the normalized property request score ($PRS_n$(instance, property)).

Heat maps can be helpful in providing information regarding completeness of a knowledge graph or other collection of instances, as well as regarding user requests. These graphs can be provided in a user interface.

Figure 18:
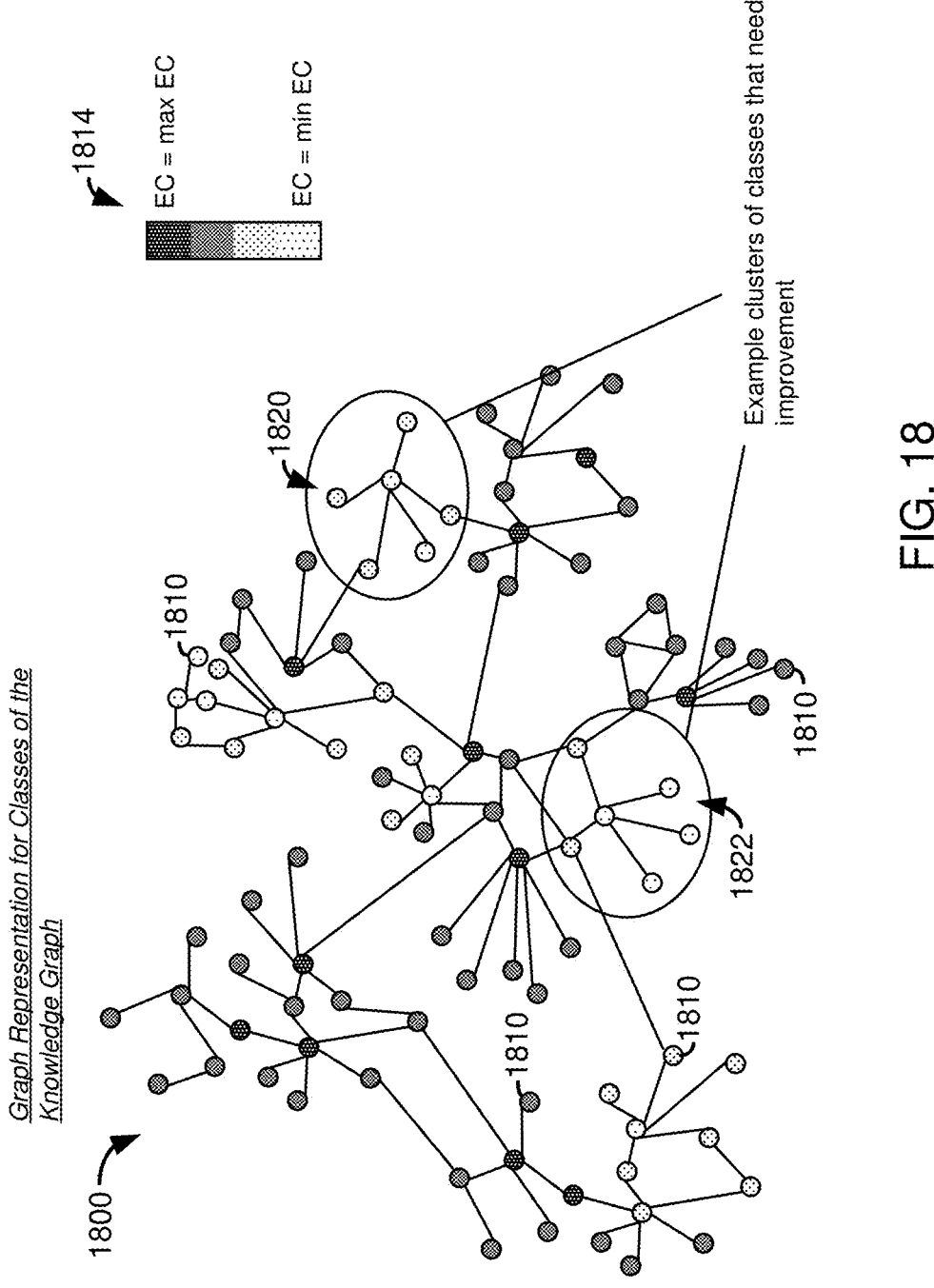
FIG. 18 is an example heat map representation of class completeness information for a knowledge graph.

FIG. 18 illustrates a knowledge graph 1800, where individual nodes 1810 are filled in a manner to indicate their expected completeness, where a legend 1814 provides a scale indicating how completeness corresponds to filled properties. Although different completeness levels are shown by varying stippling densities in the knowledge graph 1800, other types of visual indicators can be used, such as providing a color scale that ranges from colors indicating high completeness to colors representing low completeness. The nodes 1810 can represent particular classes of the knowledge graph 1800. Alternatively, the nodes 1810 can represent other knowledge graph components, such as particular instances of a class. In other scenarios, the knowledge graph 1800 can include nodes that represent classes and nodes that represent class instances, which can provide completeness information for a class overall, as well as for individual class instances. In a further implementation, the knowledge graph 1800 can also include nodes for class properties, allowing for the visualization of completeness of particular class properties.

While individual nodes 1810 can be analyzed for comparative completeness in the knowledge graph 1800, the knowledge graph also allows for clusters of more complete or less complete nodes to be visualized, as provided for clusters 1820, 1822. In this case, the clusters 1820, 1822 identify clusters of comparatively low completeness, which can indicate that a particular knowledge graph is "weak" in that area, and may be a target for efforts to improve the knowledge graph. The clusters 1820, 1822 can correspond to particular topics or subject matter areas of the knowledge graph 1800.

Figure 19:
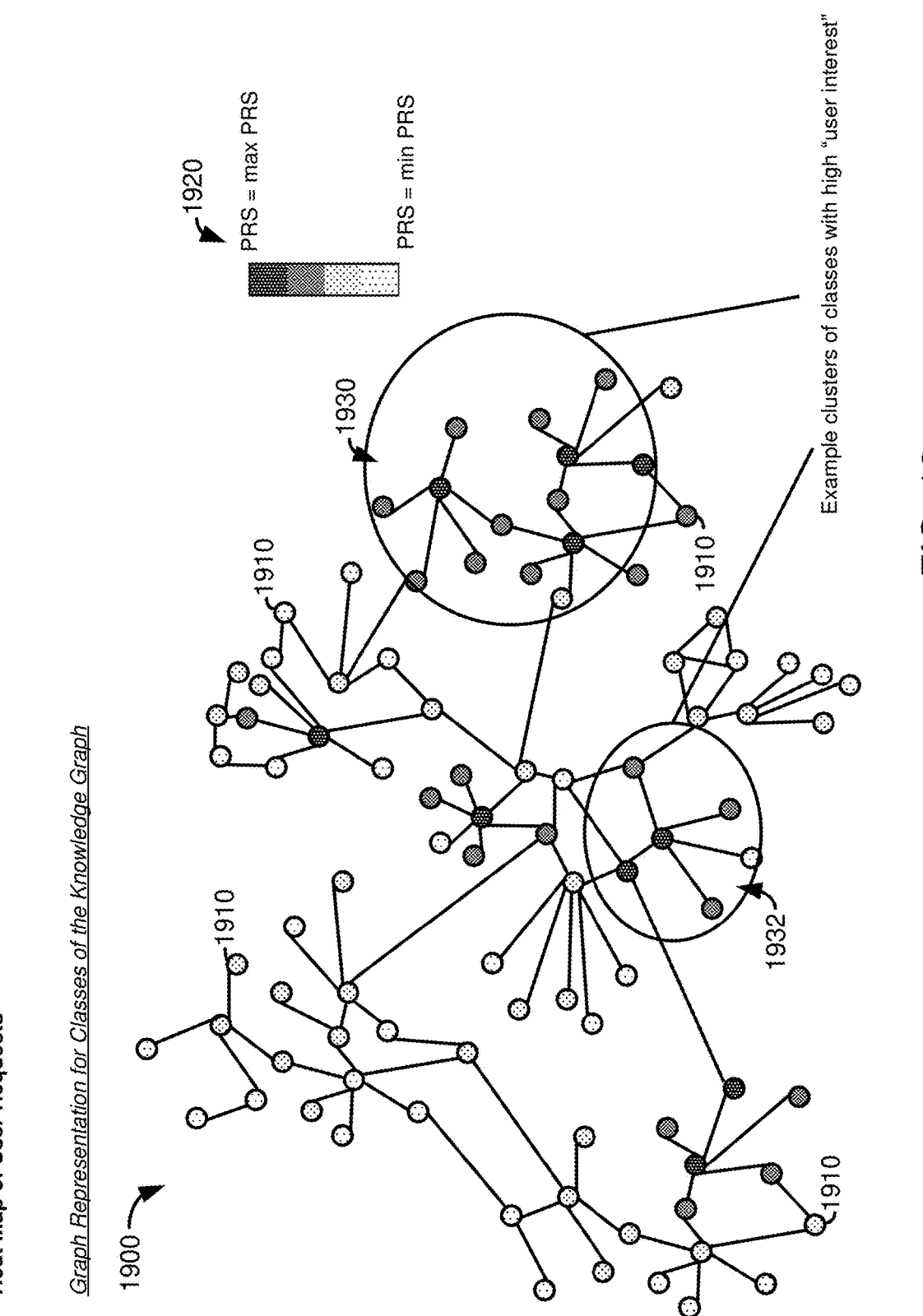
FIG. 19 is an example heat map representation of property request scores for a knowledge graph.

FIG. 19 illustrates a knowledge graph 1900, where individual nodes 1910 are filled in a manner to indicate a number of user requests for information in a given node, where the nodes can represent classes in the knowledge graph. In a similar manner as described for FIG. 18, the nodes 1910 can represent other knowledge graph elements, such as class instances. A knowledge graph 1900 can include both class nodes and class instance nodes, allowing both feature requests per instance and feature requests per class to be visualized. In a further scenario, the knowledge graph 1900 can also include nodes for particular class properties, providing a visualization of how frequently users request information for a particular class property, using the property request score (PRS). Similarly, the graph 1900 can provide nodes that represent particular properties of particular instances, thus providing more detailed information regarding user requests.

As in FIG. 18, the nodes 1910 are shown with varying stippling levels, corresponding to a scale of property request scores, as indicated in the legend 1920. In FIG. 18, higher property request score values are associated with increasing levels of stippling density.

In addition to providing information regarding property request scores for individual classes, the knowledge graph 1900 can be used to identify clusters of classes having high or low property request scores. For example, clusters 1930, 1932 are associated with higher property request scores, which can indicate that it may be beneficial to have higher property completeness/lower variance for clusters, classes, or instances that are more frequently targeted by user requests.

The information in the graphs 1800 and 1900 can be considered together, and in some cases a unified graph provided that combines the information both graphs, to provide an indication of how request frequency compares with class or instance completeness. For example, this information considered together can be used to identify classes or instances that are frequently targeted by user requests, but may have lower completeness rates or higher variance.

Example 7)—Example Addition of Missing Property Values

Various actions can be taken as a result of the disclosed techniques. For example, processes can be implemented to improve completeness for classes or class instances, including based on classes or class instances that are identified as having a high importance, such as by feature by a number of user requests or instance importance score, particularly when they are also associated with low completeness or high variance.

Figure 20:
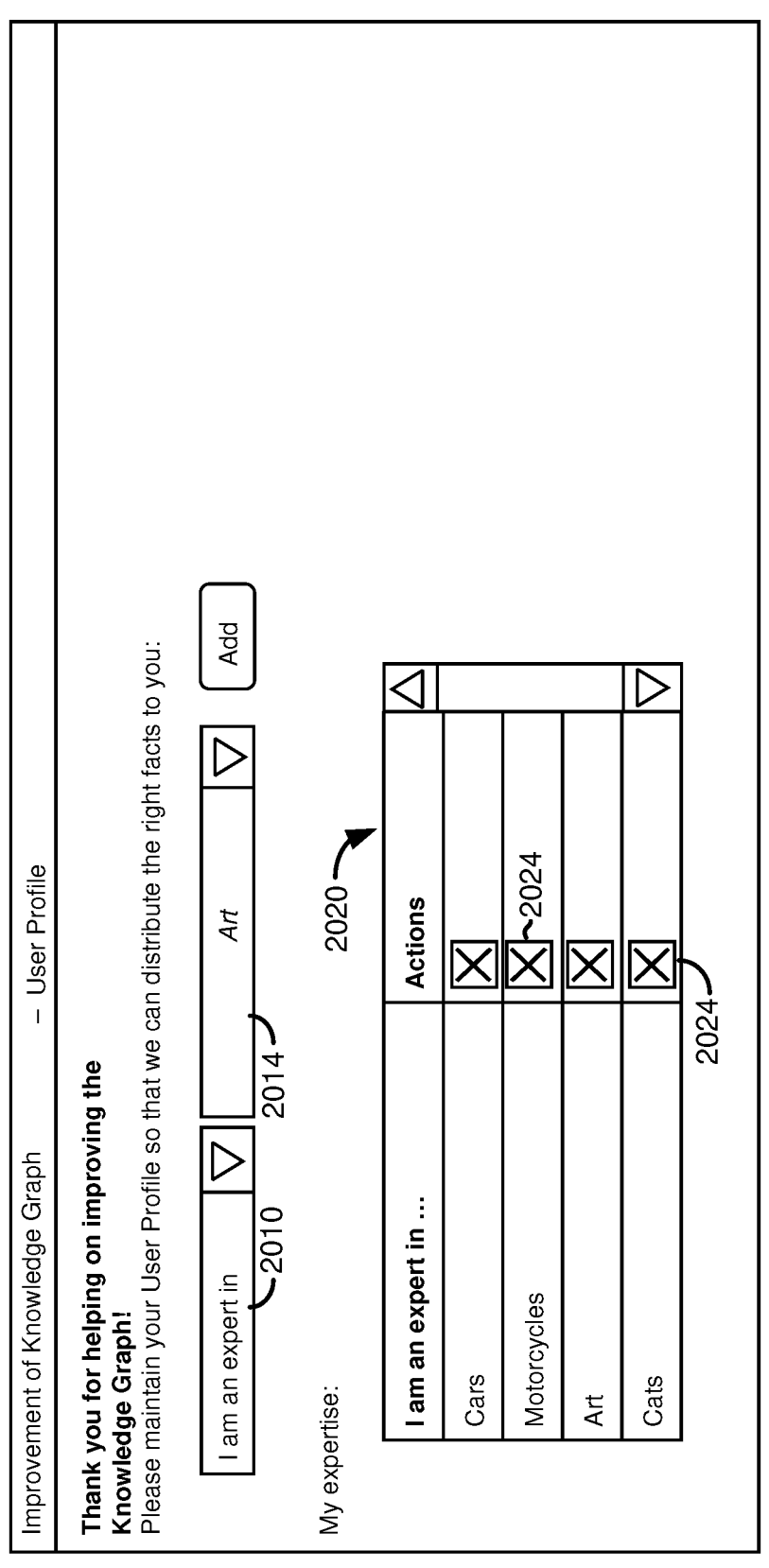
FIG. 20 is an example user interface for registering users to provide missing metric values for class instances.
Figure 21:
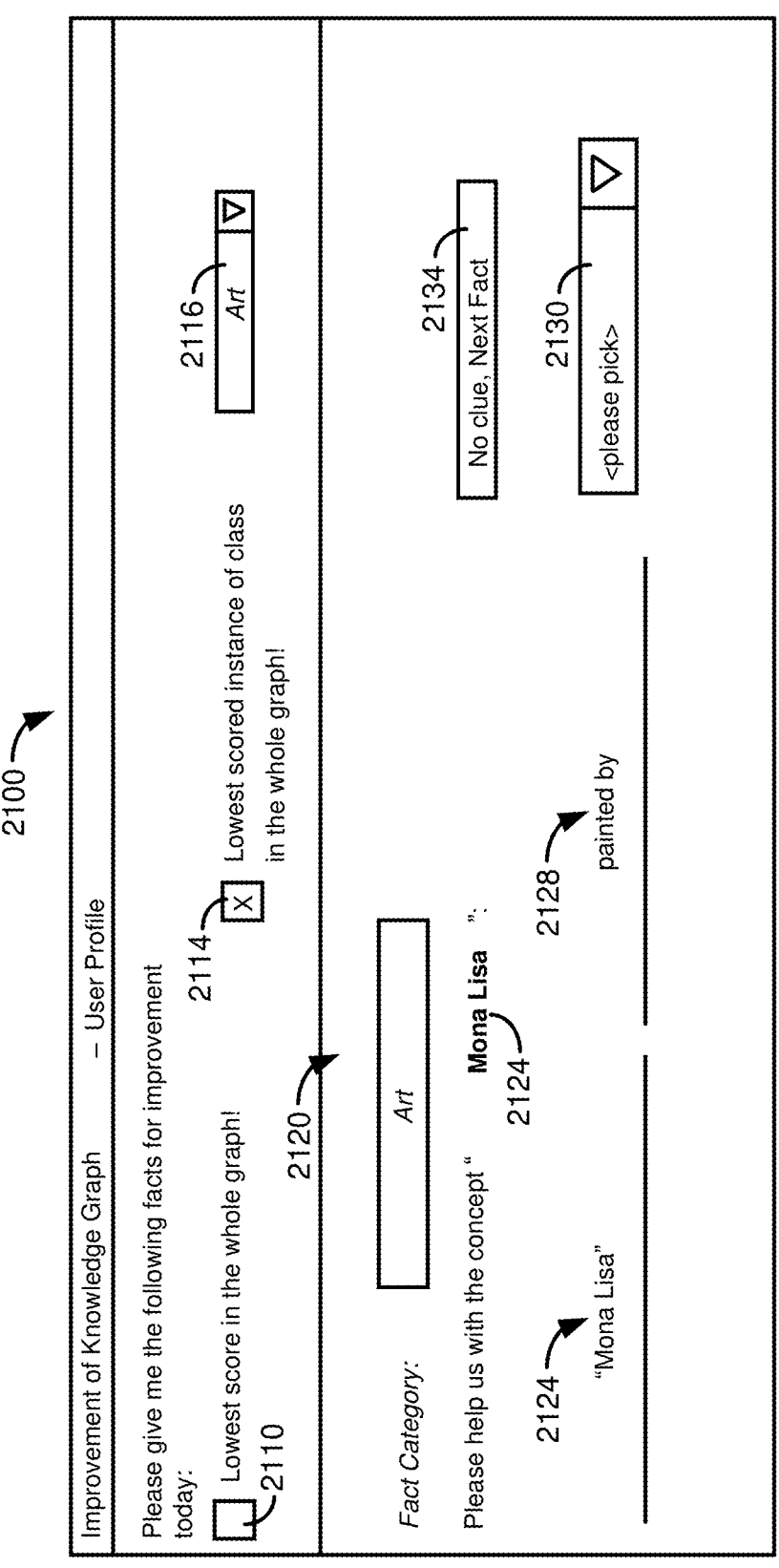
FIG. 21 is an example user interface for providing missing instance property information.

FIGS. 20 and 21 provide user interfaces that can be provided to assist users in improving information regarding instances, and thus for corresponding classes or class clusters.

To help ensure that correct information is added to instances, it can be useful to register particular users as subject matter experts with respect to particular classes or class clusters, or, if desired, for individual instances or for properties of an instance, including properties that might be shared by multiple classes.

In the user interface 2000 of FIG. 20, users can select a level of familiarity, such as being an expert, with respect to a particular knowledge graph element (such as a cluster of classes or an individual class) through user interface element 2010, where the knowledge graph element can be selected via user interface element 2014. Once a particular knowledge graph element has been selected through user interface element 2014, in some cases, additional options can be provided to a user, such as in the table 2020.

In the scenario of FIG. 20, the user can indicate their perceived level of competence with respect to a particular topic area, which can correspond to a cluster in a knowledge graph that includes multiple classes. The table 2020 can provide a list of classes in the topic, where the user can select whether they feel competent with respect to the class by selecting or deselecting user interface elements 2024.

Alternatively, the user can indicate competence in particular topics using the user interface element 2014. The table 2020 can include a list of classes in the knowledge graph, including classes that are not associated with the topic area selected using the user interface element 2014.

FIG. 21 provides a user interface 2100 through which a user can provide missing property values for an instance. A user can select what instances to complete, such as by selecting an instance with the lowest completeness score in a knowledge graph through user interface element 2110, or selecting a user interface element 2114 to select a lowest completeness score in a specified class, where the class, or a particular cluster of classes, can be specified through user interface element 2116.

After selection of a type of instance to complete, a panel 2120 of the user interface 2100 can provide information such as an identifier 2124 of a particular instance, here using the name of a painting with missing property values. The panel 2120 also provides an identifier 2128 of the missing property, and a user interface element 2130 where a property value can be provided. As shown, the user interface element 2130 is in the form of a drop-down menu, which can be useful when it is desired to limit values to those already defined for the knowledge graph. For example, it might be expected that a painter of a painting is already represented in the knowledge graph, even if the relationship between the painting and the painter has not been established. The user interface element 2130 can be implemented in a different manner, such as providing a free text field, or providing fields where values can be entered, optionally associated with constraints. For example, some properties may be associated with enumerated values or particular data types, such as integers, and an entered value is checked for compliance with any constraints.

If the user is unaware of the property value, the user can select to view a new instance or instance property by selecting user interface element 2134.

An advantage of the user interface 2100 is that it does not require users to have detailed knowledge of the knowledge graph, or technical proficiency in modifying knowledge graphs.

Users can be requested to provide information in other ways. For example, when a query, or a sufficient number of queries, has been received for a missing property value for an instance, users who have registered or otherwise identified as "experts" can be alerted about the missing information, and optionally can provide the missing information through a user interface that includes elements similar to the panel 2120.

Example 8)—Example Combination of Ontological and Usage Based Completeness Determinations Although described as being used separately, the techniques described in Examples 3-7 can be used in combination, including in prioritizing classes or instances for property value completeness, or for routing computing processes to one of multiple knowledge graphs.

For example, completeness metrics that are not determined using usage data may be complete, in that all property values defined for a class are considered, but the information may not provide an indication of what property values are important to users. Thus, prioritizing classes or instances with low completeness metric values may not provide the highest value to end users. For example, some property values may be consistently uncompleted because the property value is not that important for a class. Accordingly, results of an ontological based analysis can be further considered in view of results of a usage-based analysis, such as to prioritize classes, properties, or instances for completeness based at least in part on how important a property is to users, as reflected in the user requests.

On the other hand, completeness metrics that are determined using usage data provide information regarding which property values are important to users, as they reflect actual user requests. However, these metrics may not account for all property values defined for a class, potentially overlooking properties that are structurally important but less frequently requested. Thus, prioritizing classes or instances based solely on usage data may overlook properties that are important for the integrity of the knowledge graph.

Further, the usage metrics provide less information regarding the overall state of the knowledge graphs, such as expected completeness rates for classes, or variance in instance completeness rates within a class that can be provided using an ontology-based analysis. Accordingly, results of a usage-based analysis can be further considered in view of results of an ontological-based analysis. For example, prioritizing classes and instances for completeness can include prioritizing classes with high variance or low expected completeness rates more highly, in addition to taking usage metrics into account.

Example 9)—Example Operations

FIG. 22 is a flowchart of a process 2200 of determining data completeness in a computing system, and taking various actions if a threshold completeness is not satisfied. At 2208, a first collection of a plurality of instances is received. The plurality of instances include instances of one or more instance types and is stored as one or more instances of one or more data types in a computer-implemented data structure. The instance types define one or more properties of instances of the instance type. At least a portion of the instances associated with the one or more instance types do not comprise a value for one or more properties defined by at least one of the respective instance types and comprise a value for one or more other properties defined by at least one of the respective instance types.

At 2212, a first completeness metric for a first instance type of the one or more instance types is determined. This involves analyzing the presence or absence of property values for multiple instances of the plurality of instances having the first instance type at 2216. For given instances of the multiple instances, a number of properties for the first instance type that are unfilled for the given instance is compared to a set of one or more properties defined for the first instance type at 2220.

At 2224, in response to determining that the first completeness metric does not satisfy a first threshold, either a computing process is adjusted to access a second collection of a plurality of instances at 2228, or a value for at least one missing property value of at least one instance of the multiple instances is received at 2232.

Example 10)—Additional Examples

Example 1 provides a computing system that includes at least one memory, one or more hardware processing units coupled to the at least one memory, and one or more computer-readable storage media storing computer-executable instructions. When executed, these instructions cause the computing system to perform various operations. A first collection of a plurality of instances is received. The plurality of instances includes instances of one or more instance types and is stored as one or more instances of one or more data types in a computer-implemented data structure. The instance types define one or more properties of instances of the instance type. At least a portion of the instances associated with the one or more instance types do not include a value for one or more properties defined by at least one of the respective instance types and include a value for one or more other properties defined by at least one of the respective instance types.

A first completeness metric for a first instance type of the one or more instance types is determined. This involves analyzing the presence or absence of property values for multiple instances of the plurality of instances having the first instance type. For given instances of the multiple instances, a number of properties for the first instance type that are unfilled for the given instance is compared to a set of one or more properties defined for the first instance type. In response to determining that the first completeness metric does not satisfy a first threshold, either a computing process is adjusted to access a second collection of a plurality of instances, or a value for at least one missing property value of at least one instance of the multiple instances is received.

Example 2 is the computing system of Example 1, where the set of one or more properties defined for the first instance type are defined in an ontology, and the first instance type is a class in the ontology.

Example 3 is the computing system of Example 1 or Example 2, where the operations further include aggregating instance completeness scores for the multiple instances to provide the first completeness metric. The first completeness metric is a metric indicating a level of property completeness for the multiple instances of the first instance type.

Example 4 is the computing system of Example 3, where the operations further include calculating a second completeness metric by aggregating the first completeness metrics determined for respective properties defined for the one or more properties defined for the first instance type.

Example 5 is the computing system of Example 3 or Example 4, where the instance completeness score is determined by comparing a number of properties filled for an instance of the multiple instances to an expected completeness score defined for the first instance type.

Example 6 is the computing system of Example 1 or Example 2, where the first completeness metric is an instance completeness score determined by comparing a number of properties filled for an instance of the multiple instances to an expected completeness score defined for the first instance type.

Example 7 is the computing system of Example 4 or Example 6, where the operations further include determining a variance in instance completeness scores for the multiple instances.

Example 8 is the computing system of any of Examples 1-7, where the operations further include determining the one or more properties defined by at least one of the respective types by aggregating properties defined for the multiple instances having the first instance type.

Example 9 is the computing system of Example 1, where the operations further include logging a plurality of queries requesting one or more property values for instances of the multiple instances to provide a set of logged queries. From the set of logged queries, a total number of queries requesting values for a property of the one or more properties of the first instance type for instances of the multiple instances where a queried instance of the multiple instances did not comprise a value for the property of the query is calculated. The first completeness metric is determined using the total number of queries.

Example 10 is the computing system of Example 9, where the operations further include determining a total number of requests for respective instances of the multiple instances from the set of logged queries, and weighting the first completeness metric by the total number of requests for an instance of the multiple instances.

Example 11 is the computing system of Example 9, where the operations further include normalizing the first completeness metric using a total number of queries received for the first collection of a plurality of instances.

Example 12 is the computing system of Example 1 or any of Examples 3-8, where the set of one or more properties defined for the first instance type are defined in an ontology, and the first instance type is a class in the ontology. The first completeness metric is a metric indicating a level of property completeness for the multiple instances of the first instance type, determined by aggregating instance completeness scores for the multiple instances.

The operations further include logging a plurality of queries requesting one or more property values for instances of the multiple instances to provide a set of logged queries. From the set of logged queries, a total number of queries requesting values for a property of the one or more properties of the first instance type for instances of the multiple instances where a queried instance of the multiple instances did not comprise a value for the property of the query is calculated. A second completeness metric is determined using the total number of queries.

Example 13 is the computing system of Example 12, where either adjusting a computing process to access a second collection of a plurality of instances or receiving a value for at least one missing property value of at least one instance of the multiple instances is performed at least in part based on determining that the second completeness metric does not satisfy a second threshold.

Example 14 is the computing system of any of Examples 1-13, where adjusting a computing process to access a second collection of a plurality of instances includes receiving a first query, determining that the first completeness metric does not satisfy the first threshold, and causing the first query to be executed on the second collection of a plurality of instances in response to determining that the first completeness metric does not satisfy the first threshold.

Example 15 is the computing system of any of Examples 10-13, where the operations further include identifying an instance of the multiple instances that does not satisfy the first threshold, providing an identified instance, causing a user interface to be displayed that displays an identifier of the identified instance and an identifier of at least one property of the one or more properties for which the identified instance lacks a value, and receiving the value for the at least one missing property through the user interface.

Example 16 is the computing system of any of Examples 1-15, where the operations further include determining the first completeness metric for a second instance type of the one or more instance types. The first instance type is prioritized over the second instance type in a process of obtaining missing property values in response to determining that a value of the first completeness metric for the first instance type is further from satisfying the first threshold than a value of the second completeness metric for the second instance type.

Example 17 provides one or more non-transitory computer-readable storage media that include computer-executable instructions. When executed by a computing system that includes at least one hardware processor and at least one memory coupled to the at least one hardware processor, the computer-executable instructions cause the computing system to execute various operations. A first collection of a plurality of instances is received. The plurality of instances includes instances of one or more instance types and is stored as one or more instances of one or more data types in a computer-implemented data structure. The instance types define one or more properties of instances of the instance type. At least a portion of the instances associated with the one or more instance types do include a value for one or more properties defined by at least one of the respective instance types and include a value for one or more other properties defined by at least one of the respective instance types.

A first completeness metric for a first instance type of the one or more instance types is determined. This includes analyzing the presence or absence of property values for multiple instances of the plurality of instances having the first instance type and, for given instances of the multiple instances, comparing a number of properties for the first instance type that are unfilled for the given instance to a set of one or more properties defined for the first instance type.

Instance completeness scores for the multiple instances are aggregated to provide the first completeness metric, where the first completeness metric is a metric indicating a level of property completeness for the multiple instances of the first instance type. Alternatively, a plurality of queries requesting one or more property values for instances of the multiple instances is logged to provide a set of logged queries. From the set of logged queries, a total number of queries requesting values for a property of the one or more properties of the first instance type for instances of the multiple instances where a queried instance of the multiple instances did not include a value for the property of the query is calculated. The first completeness metric is determined using the total number of queries.

Example 18 is the one or more non-transitory computer-readable storage media of Example 17, further including computer-executable instructions that, when executed by the computing system, cause the computing system to, at least in part in response to determining that the first completeness metric does not satisfy a first threshold, either adjust a computing process to access a second collection of a plurality of instances or receive a value for at least one missing property value of at least one instance of the multiple instances.

Example 19 provides a method, implemented in a computer system that includes at least one hardware processor and at least one memory coupled to the at least one hardware processor. A first collection of a plurality of instances is received. The plurality of instances include instances of one or more instance types and is stored as one or more instances of one or more data types in a computer-implemented data structure. The instance types define one or more properties of instances of the instance type. At least a portion of the instances associated with the one or more instance types do not include a value for one or more properties defined by at least one of the respective instance types and include a value for one or more other properties defined by at least one of the respective instance types.

A first completeness metric for a first instance type of the one or more instance types is determined by analyzing the presence or absence of property values for multiple instances of the plurality of instances having the first instance type and, for given instances of the multiple instances, comparing a number of properties for the first instance type that are unfilled for the given instance to a set of one or more properties defined for the first instance type.

Instance completeness scores for the multiple instances are aggregated to provide the first completeness metric, where the first completeness metric is a metric indicating a level of property completeness for the multiple instances of the first instance type. Alternatively, a plurality of queries requesting one or more property values for instances of the multiple instances is logged to provide a set of logged queries. From the set of logged queries, a total number of queries requesting values for a property of the one or more properties of the first instance type for instances of the multiple instances where a queried instance of the multiple instances did not include a value for the property of the query is calculated. The first completeness metric is determined using the total number of queries.

Example 20 is the method of Example 19, further including, at least in part in response to determining that the first completeness metric does not satisfy a first threshold, either adjusting a computing process to access a second collection of a plurality of instances or receiving a value for at least one missing property value of at least one instance of the multiple instances.

Example 11—Computing Systems

Figure 23:
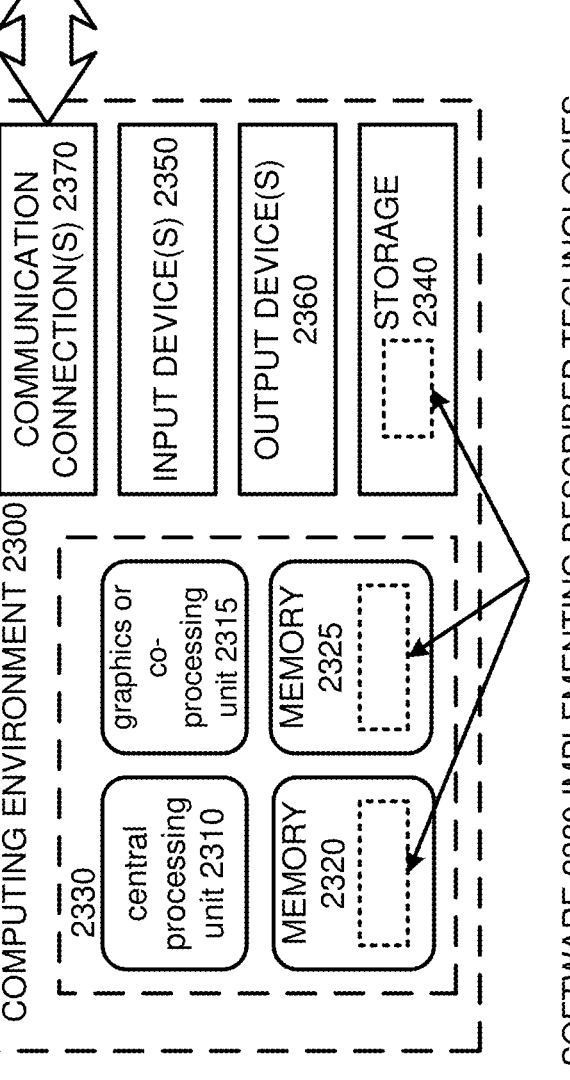
FIG. 23 is a diagram of an example computing system in which some described embodiments can be implemented.

FIG. 23 depicts a generalized example of a suitable computing system 2300 in which the described innovations may be implemented. The computing system 2300 is not intended to suggest any limitation as to scope of use or functionality of the present disclosure, as the innovations may be implemented in diverse general-purpose or special-purpose computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 execute computer-executable instructions, such as for implementing technologies described in Examples 1-17. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 23 shows a central processing unit 2310 as well as a graphics processing unit or co-processing unit 2315. The tangible memory 2320, 2325 may be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 stores software 2380 implementing one or more innovations described herein, in the form of computer-executable instructions suitable for execution by the processing unit(s) 2310, 2315.

A computing system 2300 may have additional features. For example, the computing system 2300 includes storage 2340, one or more input devices 2350, one or more output devices 2360, and one or more communication connections 2370. An interconnection mechanism (not shown) such as a bus, controller, or network interconnects the components of the computing system 2300. Typically, operating system software (not shown) provides an operating environment for other software executing in the computing system 2300, and coordinates activities of the components of the computing system 2300.

The tangible storage 2340 may be removable or non-removable, and includes magnetic disks, magnetic tapes or cassettes, CD-ROMs, DVDs, or any other medium which can be used to store information in a non-transitory way, and which can be accessed within the computing system 2300. The storage 2340 stores instructions for the software 2380 implementing one or more innovations described herein.

The input device(s) 2350 may be a touch input device such as a keyboard, mouse, pen, or trackball, a voice input device, a scanning device, or another device that provides input to the computing system 2300. The output device(s) 2360 may be a display, printer, speaker, CD-writer, or another device that provides output from the computing system 2300.

The communication connection(s) 2370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 24:
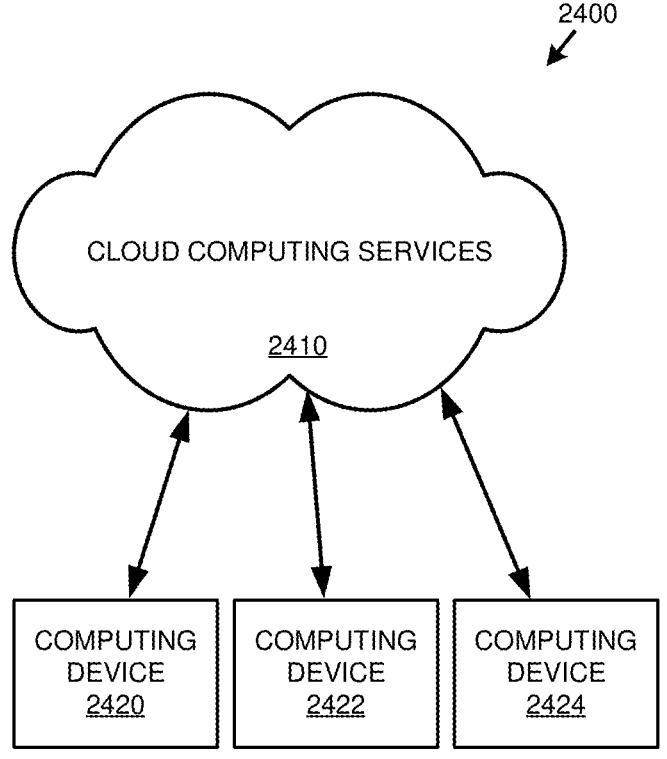
FIG. 24 is an example cloud computing environment that can be used in conjunction with the technologies described herein.

FIG. 24 depicts an example cloud computing environment 2400 in which the described technologies can be implemented. The cloud computing environment 2400 comprises cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 are utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 23, computer-readable storage media include memory 2320 and 2325, and storage 2340. The term computer-readable storage media does not include signals and carrier waves. In addition, the term computer-readable storage media does not include communication connections (e.g., 2370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processing units coupled to the at least one memory; and
   one or more computer readable storage media storing computer-executable instructions that, when executed, cause the computing system to perform operations comprising:
   receiving a first collection of a plurality of instances, the plurality of instances comprising instances of one or more instance types and being stored as one or more instances of one or more data types in a computer-implemented data structure, wherein the instance types define one or more properties of instances of the instance type, and wherein at least a portion of the instances associated with the one or more instance types do not comprise a value for one or more properties defined by at least one of the respective instance types and comprise a value for one or more other properties defined by at least one of the respective instance types;

determining a first completeness metric for a first instance type of the one or more instance types by:

(1) analyzing the presence or absence of property values for multiple instances of the plurality of instances having the first instance type; and (2) for given instances of the multiple instances, comparing a number of properties for the first instance type that are unfilled for the given instance to a set of one or more properties defined for the first instance type;

at least in part in response to determining that the first completeness metric does not satisfy a first threshold:

(A) adjusting a computing process to access a second collection of a plurality of instances; or (B) receiving a value for at least one missing property value of at least one instance of the multiple instances.

2. The computing system of claim 1, wherein the set of one or more properties defined for the first instance type are defined in an ontology, and the first instance type is a class in the ontology.

3. The computing system of claim 1, the operations further comprising:

aggregating instance completeness scores for the multiple instances to provide the first completeness metric, wherein the first completeness metric is a metric indicating a level of property completeness for the multiple instances of the first instance type.

4. The computing system of claim 3, the operations further comprising:

calculating a second completeness metric by aggregating the first completeness metrics determined for respective properties defined for the one or more properties defined for the first instance type.

5. The computing system of claim 3, wherein the instance completeness score is determined by comparing a number of properties filled for an instance of the multiple instances to an expected completeness score defined for the first instance type.

6. The computing system of claim 1, wherein the first completeness metric is an instance completeness score determined by comparing a number of properties filled for an instance of the multiple instances to an expected completeness score defined for the first instance type.

7. The computing system of claim 6, the operations further comprising:

determining a variance in instance completeness scores for the multiple instances.

8. The computing system of claim 1, the operations further comprising:

determining the one or more properties defined by at least one of the respective types by aggregating properties defined for the multiple instances having the first instance type.

9. The computing system of claim 1, the operations further comprising:

logging a plurality of queries requesting one or more property values for instances of the multiple instances to provide a set of logged queries;

from the set of logged queries, calculating a total number of queries requesting values for a property of the one or more properties of the first instance type for instances of the multiple instances where a queried instance of the multiple instances did not comprise a value for the property of the query; and determining the first completeness metric using the total number of queries.

10. The computing system of claim 9, the operations further comprising:

from the set of logged queries, for instances of the multiple instances, determining a total number of requests for respective instances of the multiple instances; and weighting the first completeness metric by the total number of requests for an instance of the multiple instances.

11. The computing system of claim 9, the operations further comprising:

normalizing the first completeness metric using a total number of queries received for the first collection of a plurality of instances.

12. The computing system of claim 1, wherein the set of one or more properties defined for the first instance type are defined in an ontology, and the first instance type is a class in the ontology, and wherein the first completeness metric is a metric indicating a level of property completeness for the multiple instances of the first instance type, determined by aggregating instance completeness scores for the multiple instances, the operations further comprising:

logging a plurality of queries requesting one or more property values for instances of the multiple instances to provide a set of logged queries;

from the set of logged queries, calculating a total number of queries requesting values for a property of the one or more properties of the first instance type for instances of the multiple instances where a queried instance of the multiple instances did not comprise a value for the property of the query; and determining a second completeness metric using the total number of queries.

13. The computing system of claim 12, wherein (A) or (B) are performed at least in part based on determining that the second completeness metric does not satisfy a second threshold.

14. The computing system of claim 1, wherein adjusting a computing process to access a second collection of a plurality of instances comprises:

receiving a first query;

determining that the first completeness metric does not satisfy the first threshold; and causing the first query to be executed on the second collection of a plurality of instances in response to determining that the first completeness metric does not satisfy the first threshold.

15. The computing system of claim 1, the operations further comprising:

identifying an instance of the multiple instances that does not satisfy the first threshold, providing an identified instance;

causing a user interface to be displayed that displays an identifier of the identified instance and an identifier of at least one property of the one or more properties for which the identified instance lacks a value; and receiving the value for the at least one missing property through the user interface.

16. The computing system of claim 1, the operations further comprising:

determining the first completeness metric for a second instance type of the one or more instance types; and prioritizing the first instance type over the second instance type in a process of obtaining missing property value in response to determining that a value of the first completeness metric for the first instance type is further from satisfying the first threshold than a value of the second completeness metric for the second instance type.

17. One or more non-transitory computer-readable storage media comprising:

computer-executable instructions that, when executed by a computing system comprising at least one hardware processor and at least one memory coupled to the at least one hardware processor, cause the computing system to receive a first collection of a plurality of instances, the plurality of instances comprising instances of one or more instance types and being stored as one or more instances of one or more data types in a computer-implemented data structure, wherein the instance types define one or more properties of instances of the instance type, and wherein at least a portion of the instances associated with the one or more instance types do not comprise a value for one or more properties defined by at least one of the respective instance types and comprise a value for one or more other properties defined by at least one of the respective instance types;

computer-executable instructions that, when executed by the computing system, cause the computing system to determine a first completeness metric for a first instance type of the one or more instance types and comprise:

(1) computer-executable instructions that, when executed by the computing system, cause the computing system to analyze the presence or absence of property values for multiple instances of the plurality of instances having the first instance type; and (2) computer-executable instructions that, when executed by the computing system, cause the computing system to, for given instances of the multiple instances, compare a number of properties for the first instance type that are unfilled for the given instance to a set of one or more properties defined for the first instance type;

(1) computer-executable instructions that, when executed by the computing system, cause the computing system to aggregate instance completeness scores for the multiple instances to provide the first completeness metric, wherein the first completeness metric is a metric indicating a level of property completeness for the multiple instances of the first instance type; or (2) computer-executable instructions that, when executed by the computing system, cause the computing system to log a plurality of queries requesting one or more property values for instances of the multiple instances to provide a set of logged queries;

computer-executable instructions that, when executed by the computing system, cause the computing system to, from the set of logged queries, calculate a total number of queries requesting values for a property of the one or more properties of the first instance type for instances of the multiple instances where a queried instance of the multiple instances did not comprise a value for the property of the query; and computer-executable instructions that, when executed by the computing system, cause the computing system to determine the first completeness metric using the total number of queries.

18. The one or more non-transitory computer-readable storage media of claim 17, further comprising:

computer-executable instructions that, when executed by the computing system, cause the computing system to, at least in part in response to determining that the first completeness metric does not satisfy a first threshold:

(A) adjust a computing process to access a second collection of a plurality of instances; or (B) receive a value for at least one missing property value of at least one instance of the multiple instances.

19. A method, implemented in a computer system comprising at least one hardware processor and at least one memory coupled to the at least one hardware processor, the method comprising:

receiving a first collection of a plurality of instances, the plurality of instances comprising instances of one or more instance types and being stored as one or more instances of one or more data types in a computer-implemented data structure, wherein the instance types define one or more properties of instances of the instance type, and wherein at least a portion of the instances associated with the one or more instance types do not comprise a value for one or more properties defined by at least one of the respective instance types and comprise a value for one or more other properties defined by at least one of the respective instance types;

determining a first completeness metric for a first instance type of the one or more instance types by:

(1) analyzing the presence or absence of property values for multiple instances of the plurality of instances having the first instance type; and (2) for given instances of the multiple instances, comparing a number of properties for the first instance type that are unfilled for the given instance to a set of one or more properties defined for the first instance type; and (1) aggregating instance completeness scores for the multiple instances to provide the first completeness metric, wherein the first completeness metric is a metric indicating a level of property completeness for the multiple instances of the first instance type; or (2) logging a plurality of queries requesting one or more property values for instances of the multiple instances to provide a set of logged queries;

from the set of logged queries, calculating a total number of queries requesting values for a property of the one or more properties of the first instance type for instances of the multiple instances where a queried instance of the multiple instances did not comprise a value for the property of the query; and determining the first completeness metric using the total number of queries.

20. The method of claim 19, further comprising:

at least in part in response to determining that the first completeness metric does not satisfy a first threshold:

(A) adjusting a computing process to access a second collection of a plurality of instances; or (B) receiving a value for at least one missing property value of at least one instance of the multiple instances.

* * * * *